(12) United States Patent
Luo et al.

(10) Patent No.: US 12,494,047 B2
(45) Date of Patent: Dec. 9, 2025

(54) MODEL TRAINING METHOD AND APPARATUS, DEIDENTIFICATION METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Yuchen Luo, Shenzhen (CN); Junwei Zhu, Shenzhen (CN); Keke He, Shenzhen (CN); Wenqing Chu, Shenzhen (CN); Ying Tai, Shenzhen (CN); Chengjie Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 340 days.

(21) Appl. No.: 18/076,073

(22) Filed: Dec. 6, 2022

(65) Prior Publication Data

US 2023/0290128 A1   Sep. 14, 2023

Related U.S. Application Data

(63) Continuation of application No. PCT/CN2022/111704, filed on Aug. 11, 2022.

(30) Foreign Application Priority Data

Mar. 10, 2022 (CN) .......................... 202210234385.2

(51) Int. Cl.
*G06V 10/776* (2022.01)
*G06F 21/62* (2013.01)
(Continued)

(52) U.S. Cl.
CPC ........ *G06V 10/776* (2022.01); *G06F 21/6254* (2013.01); *G06T 11/003* (2013.01); *G06V 10/7715* (2022.01); *G06V 10/774* (2022.01)

(58) Field of Classification Search
None
See application file for complete search history.

(56) References Cited

U.S. PATENT DOCUMENTS

| 2011/0016111 | A1  | 1/2011 | Xie et al. |
| 2022/0164585 | A1* | 5/2022 | Ayvaci .................. G06N 3/088 |
| 2022/0245961 | A1* | 8/2022 | Yan ...................... G06V 40/172 |

FOREIGN PATENT DOCUMENTS

| CN | 112668401 A | 4/2021 |
| CN | 112949535 A | 6/2021 |

(Continued)

OTHER PUBLICATIONS

Gao et al., "Information Bottleneck Disentaglement for Identity Swapping", DOI: 10.1109/CVPR46437.2021.00341, 2021 (Year: 2021).*

(Continued)

*Primary Examiner* — Chan S Park
*Assistant Examiner* — Promotto Tajrian Islam
(74) *Attorney, Agent, or Firm* — Anova Law Group, PLLC

(57) ABSTRACT

An de-identification method includes: performing sampling on a target space of a projector in a target network model to obtain N virtual identity vectors, N being a positive integer; extracting, by using an attribute extractor in the target network model, M attribute vectors from a target image, M being a positive integer; and generating, by using a generator in the target network model, a de-identified image of the target image based on the N virtual identity vectors and the M attribute vectors.

20 Claims, 11 Drawing Sheets

(51) Int. Cl.
*G06T 11/00* (2006.01)
*G06V 10/77* (2022.01)
*G06V 10/774* (2022.01)

(56) References Cited

FOREIGN PATENT DOCUMENTS

| | | |
|---|---|---|
| CN | 113033511 A | 6/2021 |
| CN | 113642409 A | 11/2021 |
| CN | 114120041 A | 3/2022 |
| CN | 114139198 A | 3/2022 |
| WO | 2021254499 A1 | 12/2021 |
| WO | 2021258920 A1 | 12/2021 |

OTHER PUBLICATIONS

Zhu et al., "One Shot Face Swapping on Megapixels", DOI: 10.1109/CVPR46437.2021.00480, 2021 (Year: 2021).*

Karras et al., "Analyzing and Improving the Image Quality of StyleGAN", DOI: 10.48550/arXiv.1912.04958, 2020 (Year: 2020).*

Yang et al., "GAN Prior Embedded Network for Blind Face Restoration in the Wild", DOI: 10.1109/CVPR46437.2021.00073, 2021 (Year: 2021).*

Song et al., "AgileGAN: Stylizing Portraits by Inversion and Consistent Transfer Learning", DOI: 10.1145/3450626.3459771, 2021 (Year: 2021).*

He et al., "Momentum Contrast for Unsupervised Visual Representation learning", DOI: 10.48550/arXiv.1911.05722, 2020 (Year: 2020).*

Aaron van den Oord, Yazhe Li, and Oriol Vinyals. Representation learning with contrastive predictive coding. arXiv preprint arXiv:1807.03748, 2018.

Maxim Maximov, Ismail Elezi, and Laura Leal-Taixe. CIAGAN: conditional identity anonymization generative adversarial networks. In CVPR, 2020.

Tero Karras, Samuli Laine, Miika Aittala, Janne Hellslen, Jaakko Lehtinen, and Time Aila. Analyzing and improving the image quality of StyleGAN. In CVPR, 2020.

Kaiming He, Haoqi Fan, Yuxin Wu, Saining Xie, and Ross Girshick. Momentum contrast for unsupervised visual representation learning. In CVPR, Jun. 2020.

The World Intellectual Property Organization (WIPO) International Search Report for PCT/CN2022/111704 Dec. 7, 2022 12 Pages (including translation).

Tero Karras, Samuli Laine, Miika Aittala, Janne Hellsten, Jaakko Lehtinen, and Timo Aila. Analyzing and improving the image quality of StyleGAN. In CVPR, 2020.

China National Intellectual Property Administration (CNIPA) Office Action 1 for 202210234385.2, May 20, 2025 10 Pages (including translation).

Korean Intellectual Property Office (KIPO) Office Action 1 for Application No. 10-2022-7038590 Oct. 20, 2025 15 Pages (including translation).

Jingyi et al., "Personalized and Invertible Face De-identification by Disentangled Identity Information Manipulation", The Institute of Image Communication and Network Engineering, Shanghai JiaoTong University, Oct. 10, 2021.

* cited by examiner

MODEL TRAINING METHOD AND APPARATUS, DEIDENTIFICATION METHOD AND APPARATUS, DEVICE, AND STORAGE MEDIUM

CROSS-REFERENCES TO RELATED APPLICATIONS

This application is a continuation application of PCT Patent Application No. PCT/CN2022/111704, filed on Aug. 11, 2022, which claims priority to Chinese Patent Application No. 202210234385.2 filed on Mar. 10, 2022, the entire contents of both of which are incorporated herein by reference.

FIELD OF THE TECHNOLOGY

The present disclosure relates to the field of image processing technologies, and in particular, to a model training method and apparatus, an de-identification method and apparatus, a device, a storage medium, and a program product.

BACKGROUND OF THE DISCLOSURE

De-identification is to remove a recognizable identity feature in an image or a video, but meanwhile keep other identity-free attributes unchanged, and ensure that an anonymized picture or video is still visually real.

In a related technology, a conditional generative adversarial network (GAN) is used for generating an anonymized picture, and a posture key point of an original picture is extracted, and the posture key point of the original picture and a background picture with face area removed are inputted to a model as conditions, to generate a new virtual identity to fill the vacant face area. However, in this method, the background picture with the face area removed is used as model input, and therefore a picture generated by the model has poor quality.

SUMMARY

Embodiments of the present disclosure provide a model training method and apparatus, an de-identification method and apparatus, a computing device, a computer-readable storage medium, and a computer program product, to improve quality of a generated de-identified image.

An embodiment of the present disclosure provides a model training method, including: projecting, by using a projector in a target network model, a first training image to a target space to obtain N first virtual identity vectors, N being a positive integer; extracting, by using an attribute extractor in the target network model, M attribute vectors from a second training image, M being a positive integer; generating, by using a generator in the target network model, an de-identified image of the second training image based on the N first virtual identity vectors and the M attribute vectors; and determining a loss of the target network model according to the de-identified image, and training the target network model according to the loss.

An embodiment of the present disclosure further provides an de-identification method, including: performing sampling on a target space of a projector in a target network model to obtain N virtual identity vectors, N being a positive integer; extracting, by using an attribute extractor in the target network model, M attribute vectors from a target image, M being a positive integer; and generating, by using a generator in the target network model, a de-identified image of the target image based on the N virtual identity vectors and the M attribute vectors.

An embodiment of the present disclosure further provides a model training apparatus, including: a projection unit, configured to project, by using a projector in a target network model, a first training image to a target space to obtain N first virtual identity vectors, N being a positive integer; an attribute unit, configured to extract, by using an attribute extractor in the target network model, M attribute vectors from a second training image, M being a positive integer; a fusion unit, configured to generate, by using a generator in the target network model, an de-identified image of the second training image based on the N first virtual identity vectors and the M attribute vectors; and a training unit, configured to determine a loss of the target network model according to the de-identified image, and train the target network model according to the loss.

An embodiment of the present disclosure further provides an de-identification apparatus, including: a sampling unit, configured to perform sampling on a target space of a projector in a target network model to obtain N virtual identity vectors, N being a positive integer; an attribute unit, configured to extract, by using an attribute extractor in the target network model, M attribute vectors from a target image, M being a positive integer; and an anonymization unit, configured to generate, by using a generator in the target network model, a de-identified image of the target image based on the N virtual identity vectors and the M attribute vectors.

An embodiment of the present disclosure further provides a computing device, including a processor and a memory. The memory is configured to store a computer program. The processor is configured to invoke and run the computer program stored in the memory to perform the model training method or the de-identification method provided in the embodiments of the present disclosure.

An embodiment of the present disclosure further provides a chip, configured to implement the model training method or the de-identification method provided in the embodiments of the present disclosure. The chip includes: a processor, configured to call and run a computer program from the memory, so that the device with the chip installed executes the foregoing model training method or de-identification method provided in the embodiments of the present disclosure.

An embodiment of the present disclosure further provides a non-transitory computer-readable storage medium. The computer-readable storage medium is configured to store a computer program, the computer program, when executed, implementing the model training method or de-identification method provided in the embodiments of the present disclosure.

This embodiment of the present invention has the following beneficial effects:

In the training process of the target network model, the first training image is projected to the target space to obtain the N first virtual identity vectors, so that the target network model can fully learn identity information in the image; attribute vector extraction is performed on the second training image to obtain the M attribute vectors, so that the target network model fully learns attribute information in the image; and image generation is performed based on the N first virtual identity vectors and the M attribute vectors to obtain the de-identified image of the second training image. In this way, a trained model can generate an image carrying virtual identity information while ensuring that attribute information of an original image remains unchanged;

In the application process of the target network model, sampling is performed on the target space of the projector to obtain the N virtual identity vectors, so that virtual identity information is generated; attribute vector extraction is performed on the target image to obtain the M attribute vectors, to ensure that an attribute feature in the target image is not lost, and therefore ensure quality of the generated de-identified image; and image generation is performed based on the N virtual identity vectors and the M attribute vectors to obtain the de-identified image of the target image, so that an de-identified image carrying virtual identity information, that is, with real identity hidden, is generated while ensuring that attribute information of the target image remains unchanged. That is, in the embodiments of the present disclosure, during de-identification, an independent virtual identity is generated by using the target network model, without removing a face area in an image, thereby improving fidelity and a resolution of de-identification.

DESCRIPTION OF EMBODIMENTS

Figure 1A:
FIG. 1A is a schematic diagram of a real image according to an embodiment of the present disclosure.

The following clearly and completely describes the technical solutions in the embodiments of the present disclosure with reference to the accompanying drawings in the embodiments of the present disclosure.

It should be understood that in the embodiments of the present disclosure, "B corresponding to A" indicates that B is associated with A. In an implementation, B may be determined based on A. However, it is to be further understood that determining B according to A does not mean that determining B only according to A, and B may be determined according to A and/or other information.

In the descriptions of embodiments of the present disclosure, unless otherwise described, "a plurality of" means two or more than two.

In addition, for ease of describing the technical solutions in the embodiments of the present disclosure clearly, in the embodiments of the present disclosure, terms such as "first", "second", and "third" are used to distinguish same or similar items with basically same function and purpose. A person skilled in the art may understand that the terms such as "first", "second", and "third" do not define a quantity and an execution sequence, and the terms such as "first", "second", and "third" do not indicate a definite difference.

For ease of understanding the embodiments of the present disclosure, related concepts involved in the embodiments of the present disclosure are first briefly introduced below.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science. This technology attempts to understand the essence of intelligence and produce a new intelligent machine that can react in a manner similar to human intelligence. AI is to study the design principles and implementation methods of various intelligent machines, so that the machines can perceive, infer, and make decisions.

The AI technology is a comprehensive subject, relating to a wide range of fields, and involving both hardware and software techniques. Basic AI technologies generally include technologies such as sensors, dedicated AI chips, cloud computing, distributed storage, big data processing technologies, operating/interaction systems, and mechatronics. An AI software technology mainly includes fields such as a CV technology, a speech processing technology, a natural language processing technology, and machine learning/deep learning (DL).

ML is a multi-field interdiscipline, and relates to a plurality of disciplines such as the probability theory, statistics, the approximation theory, convex analysis, and the algorithm complexity theory. ML specializes in studying how a computer simulates or implements a human learning behavior to acquire new knowledge or skills, and reorganize an existing knowledge structure, so as to keep improving its performance. The ML is the core of the AI, is a basic way to make the computer intelligent, and is applied to various fields of AI. The ML and DL generally include technologies such as an artificial neural network, a belief network, reinforcement learning, transfer learning, inductive learning, and learning from demonstrations.

Figure 1B:
FIG. 1B to FIG. 1D are schematic diagrams of an de-identified image corresponding to FIG. 1A according to an embodiment of the present disclosure.
Figure 1C:
Figure 1D:

A method in the embodiments of the present disclosure may be applied to any scenario in which an image needs to be anonymized. For example, as shown in FIG. 1A to FIG. 1D, FIG. 1A shows a real image, and FIG. 1B to FIG. 1D show an de-identified image of FIG. 1A. Through comparison between FIG. 1A and FIG. 1B to FIG. 1D, it can be learned that, in FIG. 1B to FIG. 1D, a recognizable identity feature in FIG. 1A is removed, while other identity-free attributes are kept unchanged, and it is ensured that the image is still visually real.

Scenario 1: The embodiments of the present disclosure may be applied to a privacy protection scenario. For example, for a face-related picture or video, the method in the embodiments of the present disclosure may be used for replacing a real identity with virtual identity, so that subsequent tasks such as detection can be further performed without privacy leakage. In addition, when publishing a picture or a video, a user may also use the method in the embodiments of the present disclosure to an identity feature of the user, to avoid leakage of real information.

Scenario 2: The embodiments of the present disclosure may be applied to a scenario of generating a virtual image. For example, the technical solutions in the embodiments of the present disclosure may be used for generating a virtual identity, for example, a fixed latent identity variable, and replacing a background picture, to generate pictures or videos of a specific virtual image in different scenarios.

The scenario 1 and the scenario 2 are described by using an example in which a target is a face. The method in the embodiments of the present disclosure may be alternatively applied to a scenario of performing de-identification on another non-face target, for example, performing de-identification on any target such as an animal or a vehicle in a target image.

In some embodiments, the method in the embodiments of the application may be applied to an intelligent transport system. An intelligent transport system (Intelligent Transport System, ITS) is also referred to as an intelligent transportation system (Intelligent Transportation System) and applies advanced technologies (an information technology, a computer technology, a data communications technology, a sensor technology, an electronic control technology, an automatic control technology, an artificial intelligence technology, and the like) to transportation, service control, and vehicle manufacturing comprehensively and effectively, so as to strengthen a connection between a vehicle, a road, and a user, thereby forming an integrated transportation system for safety assurance, efficiency improvement, environmental enhancement, and energy saving. For example, a solution combined with intelligent traffic in the present disclosure may be as follows: An in-vehicle device collects a face image of a user, performs de-identification on the collected face image by using the method in the embodiments of the present disclosure, and then transmits an de-identified image to another device for performing task analysis or the like, for example, performing illegal driving analysis or intelligent driving analysis.

Figure 2:
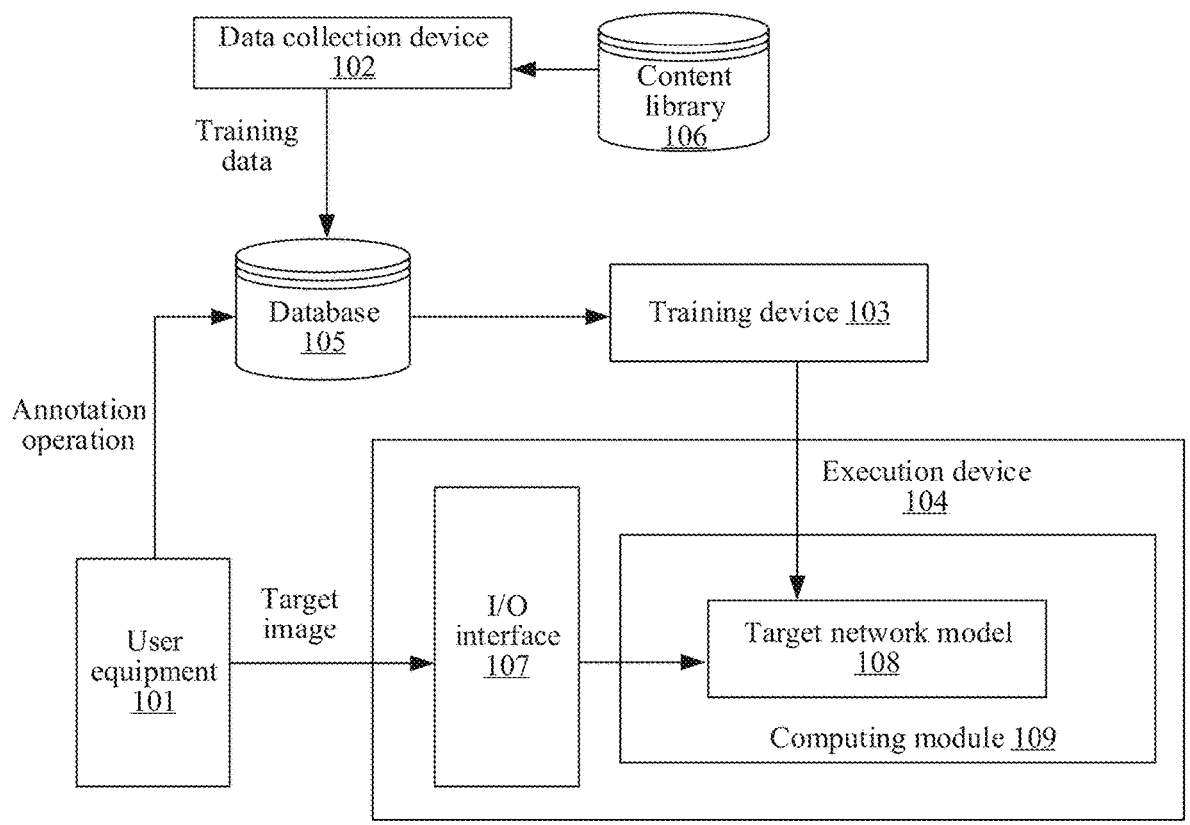
FIG. 2 is a schematic diagram of a system architecture according to an embodiment of the present disclosure.

FIG. 2 is a schematic diagram of a system architecture according to an embodiment of the present disclosure. The system architecture includes user equipment 101, a data collection device 102, a training device 103, an execution device 104, a database 105, a content library 106, an I/O interface 107, and a target network model 108.

The data collection device 102 is configured to read training data from the content library 106, and store the read training data to the database 105. The training data involved in this embodiment of the present disclosure includes a first training image, a second training image, and a third training image, and the first training image, the second training image, and the third training image are all used for training the target network model.

In some embodiments, the user equipment 101 is configured to perform an annotation operation on data in the database 105.

The training device 103 trains the target network model 108 based on the training data maintained in the database 105, so that a trained target network model 108 can generate an de-identified image of a target image. In some embodiments, the target network model 108 obtained by the training device 103 may be applied to different systems or devices.

In FIG. 2, the execution device 104 is equipped with an I/O interface 107, for exchanging data with an external device, for example, receiving, by using the I/O interface, a target image transmitted by the user equipment 101. A computing module 109 in the execution device 104 processes the inputted target image by using the trained target network model 108 to output an de-identified image, and outputs the generated de-identified image to the user equipment 101 for display, or inputs the generated de-identified image to another task model for performing other task processing.

The user equipment 101 may include a mobile phone, a tablet computer, a notebook computer, a palmtop computer, a mobile Internet device (MID), or another terminal device with function of installing a browser.

The execution device 104 may be a server. There may be one or more servers. When there are a plurality of servers, there may be at least one of the following cases: At least two servers are configured to provide different services; or at least two servers are configured to provide the same service, for example, provide the same service in a load balancing manner. This is not limited in this embodiment of the present disclosure. The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. Alternatively, the server may become a node of a blockchain.

In this embodiment, the execution device 104 is connected to the user equipment 101 through a network. The network may be a wireless or wired network, for example, an intranet, the Internet, a Global System for Mobile Communications (GSM) network, a wideband code division multiple access (WCDMA) network, a 4G network, a 5G network, a Bluetooth network, a Wi-Fi network, or a call network.

FIG. 2 is only a schematic diagram of a system architecture according to an embodiment of the present disclosure, and a position relationship between the devices, the components, the modules, and the like shown in the figure does not constitute any limitation. In some embodiments, the data collection device 102, the user equipment 101, the training device 103, and the execution device 104 may be the same device. The database 105 may be distributed on one or more servers, and the content library 106 may be distributed on one or more servers.

Some embodiments are used below to describe in detail the technical solutions of the embodiments of the present disclosure. The following embodiments may be mutually combined, and same or similar concepts or processes may not be repeatedly described in some embodiments.

The present disclosure provides a target network model, and the target network model is used for performing de-identification on a target (for example, a face) in a target image to generate an de-identified image of the target image.

Therefore, in some embodiments, the target network model may be referred to as an de-identification model or an identity anonymizer.

First, a training process of the target network model is described.

Figure 3:
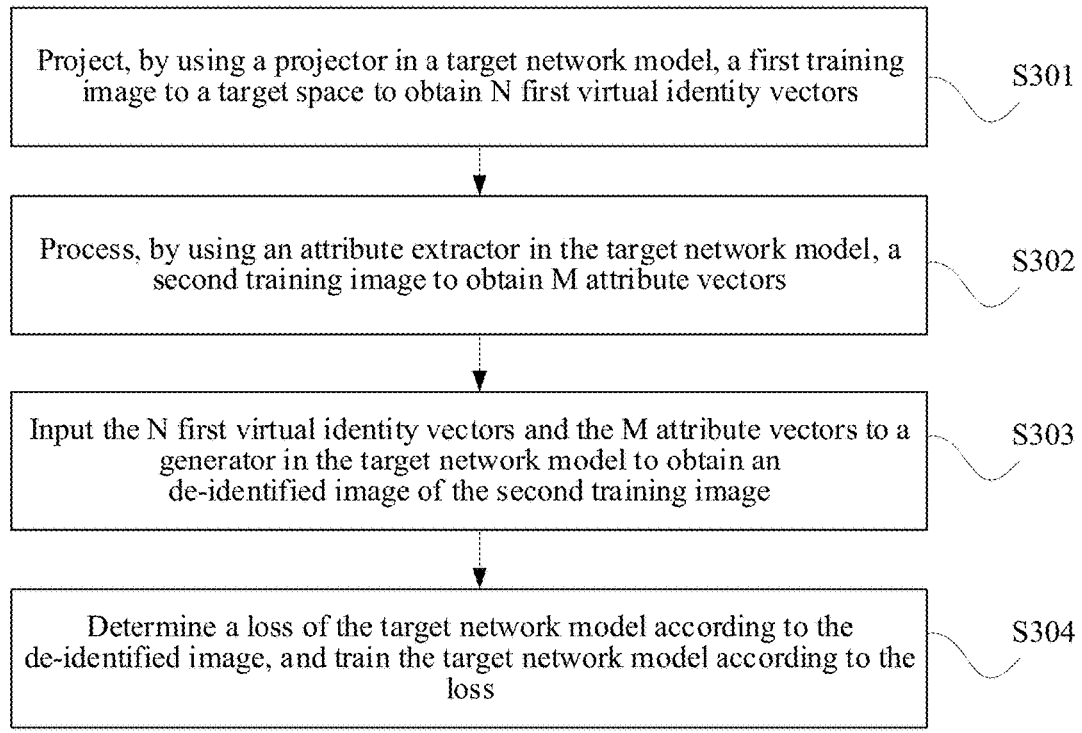
FIG. 3 is a schematic flowchart of a model training method according to an embodiment of the present disclosure.

FIG. 3 is a schematic flowchart of a model training method according to an embodiment of the present disclosure. In this embodiment of the present disclosure, the method is performed by an apparatus with model training function, for example, a model training apparatus, and the model training apparatus may be a computing device, or a part of a computing device. The following provides descriptions by using an example in which the method is performed by a computing device. As shown in FIG. 3, the method of this embodiment of the present disclosure includes:

S301: The computing device projects, by using a projector in a target network model, a first training image to a target space to obtain N first virtual identity vectors, N being a positive integer.

In this embodiment of the present disclosure, the first training image is a training image in training data. When the first training image is a face image, the first training image is obtained with permission by a user, and collection, use, and processing of related image data need to comply with related laws, regulations, and standards of related countries and regions.

In this embodiment of the present disclosure, processes of training models by using first training images are basically similar. For ease of description, one first training image is used as an example for description.

In this embodiment of the present disclosure, the first training image is projected to the target space by using the target network model to obtain one or more virtual identity vectors of the first training image, so that the target network model learns identity information of the first training image. After the target network model fully learns the identity information, during actual de-identification, the target space of the target network model may be directly sampled to generate a virtual identity vector.

This embodiment of the present disclosure mainly relates to the following concepts: an attribute vector and a virtual identity vector.

The virtual identity vector is a vector corresponding to virtual identity information, and the virtual identity information is identity information with recognizable identity feature hidden, for example, face information with recognizable identity feature of a face hidden.

The attribute vector is a vector corresponding to attribute information, and feature information other than a recognizable identity feature in an image is referred to as attribute information, for example, background information.

In this embodiment of the present disclosure, the target network model may generate an independent virtual identity vector.

Figure 4:
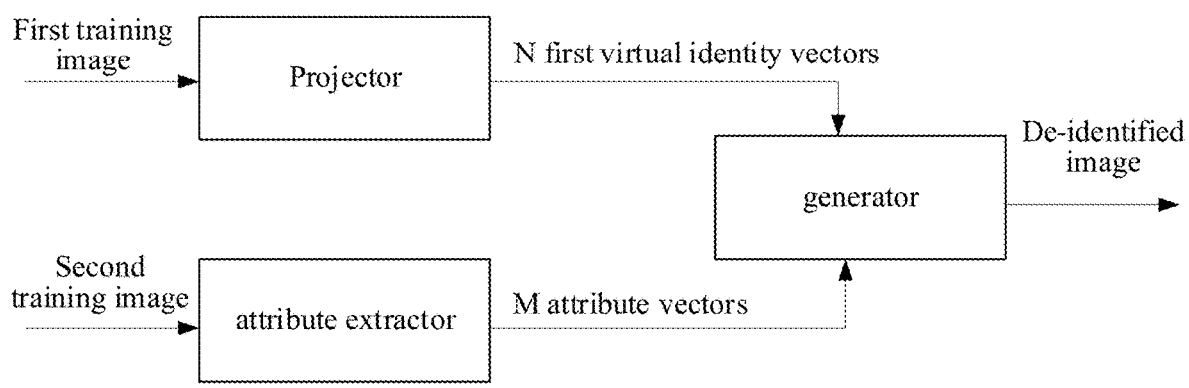
FIG. 4 to FIG. 6 are schematic structural diagrams of target network models according to an embodiment of the present disclosure.

FIG. 4 is a schematic structural diagram of a target network model according to an embodiment of the present disclosure. As shown in FIG. 4, the target network model in this embodiment of the present disclosure includes a projector (e.g., a projection module), an attribute extractor (e.g., an attribute module), and a generator (e.g., fusion module).

The projector is configured to project a first training image to a target space to obtain N first virtual identity vectors of the first training image. N is a positive integer. A value of N is not limited in this embodiment of the present disclosure, and may be set according to an actual requirement.

The attribute unit is configured to extract M attribute vectors from a second training image of the second training image. M is a positive integer. A value of M is not limited in this embodiment of the present disclosure, and may be set according to an actual requirement. In some embodiments, M is equal to N.

The generator is configured to generate an de-identified image of the second training image based on the N first virtual identity vectors and the M attribute vectors.

When N is a positive integer greater than 1, the N first virtual identity vectors respectively correspond to different resolutions.

It can be learned from the foregoing descriptions that, in the target network model in this embodiment of the present disclosure, the projector is configured to generate a virtual identity vector of a target in the second training image, a real identity feature of the target in the second training image being hidden in the virtual identity vector; and the attribute extractor is configured to extract an attribute vector of the second training image, features other than the real identity feature of the target in the second training image being retained in the attribute vector. In this way, after the generator performs image generation based on the virtual identity vector and the attribute vector, an anonymized image in which an identity of the target in the second training image is hidden, namely, an de-identified image, can be obtained.

Figure 5:
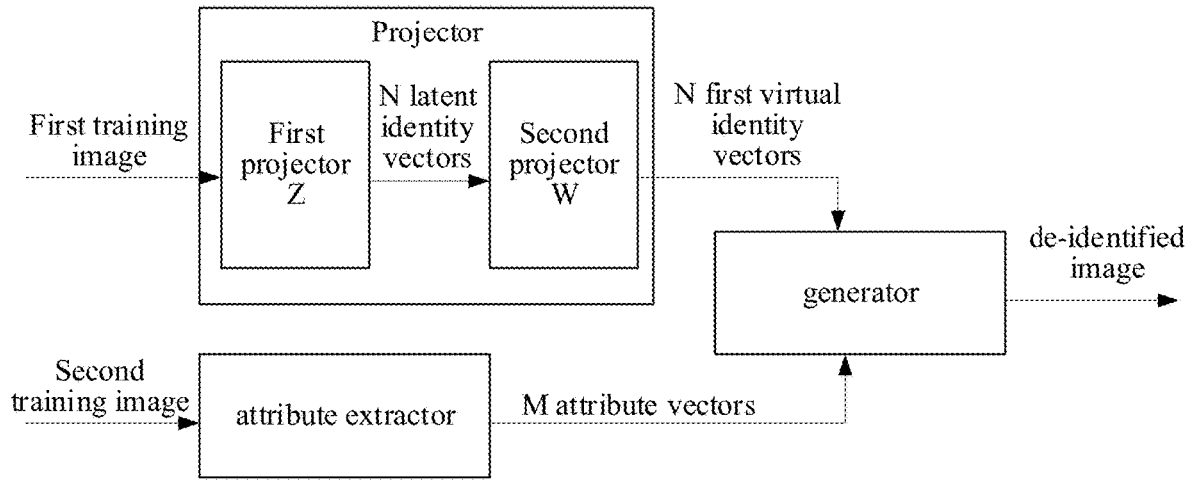

In some embodiments, as shown in FIG. 5, the projector includes a first projector and a second projector, and the target space includes a first space Z and a second space W. In this case, the computing device may implement, in the following manner by using the projector in the target network model, the projecting a first training image to a target space to obtain N first virtual identity vectors:

extracting priori identity information of the first training image; projecting, by using the first projector, the priori identity information to the first space Z to obtain N latent identity vectors; and projecting, by using the second projector, the N latent identity vectors to the second space W to obtain the N first virtual identity vectors.

As shown in FIG. 5, first, the priori identity information of the first training image is extracted, for example, the priori identity information of the first training image is extracted by using a pre-trained recognition model; then the priori identity information of the first training image is projected, by using the first projector, to the first space Z to obtain the N latent identity vectors; and then the N latent identity vectors is projected, by using the second projector, to the second space W to obtain the N first virtual identity vectors.

The first space Z and the second space W may be different latent spaces. The first space Z and the second space W are not limited in this embodiment of the present disclosure.

In some embodiments, the first space is a latent space Z, and the latent space Z conforms to a standard Gaussian distribution.

In this case, the first projector may project, in the following manner, the priori identity information to the first space Z to obtain the N latent identity vectors:

projecting, by using the first projector, the priori identity information as a mean and a variance of the first space; and performing sampling based on the mean and the variance of the first space to obtain the N latent identity vectors.

In some embodiments, the first projector is a variational autoencoder (VAE), for example, a conditional variational autoencoder (CVAE). The conditional variational autoencoder is a generative network, and learns a data distribution by using an encoder to obtain a latent variable, and then restores the latent variable to an original form of data by using a decoder. The conditional variational autoencoder may learn a data distribution and then perform sampling to generate new data, and is usually used for image generation.

In this way, the priori identity information of the first training image may be inputted to the VAE, and the VAE projects the priori identity information as a mean and a variance of the first space. Then sampling is performed based on the mean and the variance of the first space to obtain the N latent identity vectors of the first training image.

In this example, the first space is the latent space Z conforming to a standard Gaussian distribution. Therefore, to enhance an expression ability of the latent space, in this embodiment of the present disclosure, different latent vectors are generated at different resolution layers, for example, the N latent identity vectors are generated. This is equivalent to constructing a Z+space including a plurality of latent identity vectors.

In some embodiments, the second space W is obtained based on the latent space Z, for example, obtained by performing linear or nonlinear mapping on the latent space Z.

A network structure of the second projector is not limited in this embodiment of the present disclosure. For example, a mapping network is used, and the mapping network includes a plurality of fully connected layers.

In this embodiment of the present disclosure, the priori identity information of the first training image is projected to a latent space (namely, the target space) of the projector, so that the projector fully learns identity information of the first training image, for subsequently generating a virtual identity vector that meets an actual requirement.

S302: Extract, by using an attribute extractor in the target network model, M attribute vectors from a second training image, M being a positive integer.

The second training image is any image in a training data set, and the second training image and the first training image may be the same image or different images.

In this embodiment of the present disclosure, the attribute extractor is configured to learn attribute information of the second training image to generate the M attribute vectors.

A network model of the attribute extractor is not limited in this embodiment of the present disclosure.

Figure 6:
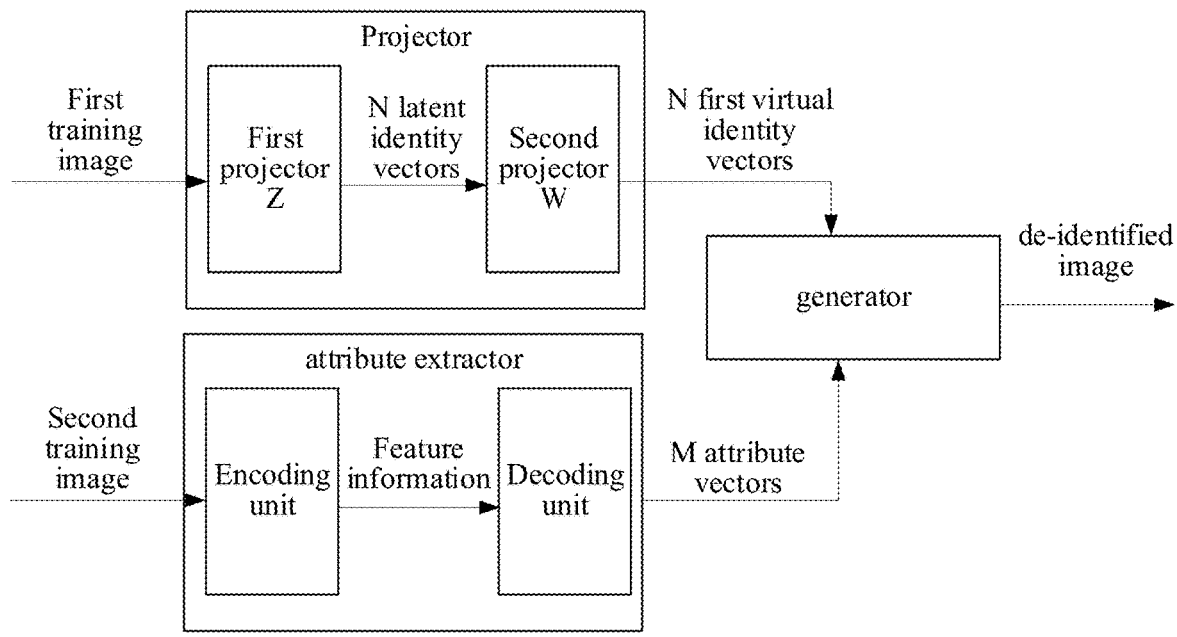

In some embodiments, as shown in FIG. 6, the attribute extractor includes an encoding unit (i.e., an encoder) and a decoding unit (i.e., a decoder). In this case, attribute vector extraction may be performed on the second training image in the following manner by using the attribute extractor in target network model, to obtain the M attribute vectors:

inputting the second training image to the encoding unit to obtain feature information of the second training image; and inputting the feature information to the decoding unit to obtain the M attribute vectors.

In some embodiments, the encoding unit includes a plurality of feature extraction layers, the decoding unit also includes a plurality of feature extraction layers, and a skip connection is implemented between at least one feature extraction layer in the encoding unit and at least one feature extraction layer in the decoding unit.

After the N first virtual identity vectors and the M attribute vectors are generated according to the foregoing steps, the following S303 is performed.

S303: Generate, by using a generator in the target network model, an de-identified image of the second training image based on the N first virtual identity vectors and the M attribute vectors.

Example 1: The N first virtual identity vectors are spliced to obtain a spliced first virtual identity vector, the M attribute vectors are spliced to obtain a spliced attribute vector, and the spliced first virtual identity vector and the spliced attribute vector are used for performing image generation and then inputted to the generator to generate the de-identified image.

For example, the spliced first virtual identity vector and the spliced attribute vector are concatenated and then inputted to the generator to generate the de-identified image.

For another example, the spliced first virtual identity vector and the spliced attribute vector are added up and then inputted to the generator to generate the de-identified image.

Example 2: The generator includes a plurality of different resolution layers. In this case, the generator may perform image generation in the following manner based on the N first virtual identity vectors and the M attribute vectors to obtain the de-identified image of the second training image.

According to resolutions corresponding to the N first virtual identity vectors, inputting the N first virtual identity vectors to a corresponding resolution layer as patterns, and inputting the M attribute vectors to a corresponding resolution layer as noises, to obtain the de-identified image of the second training image.

For example, N is 3, M is 4, and the generator includes four different resolution layers. The three first virtual identity vectors are denoted as a first virtual identity vector 1, a first virtual identity vector 2, and a first virtual identity vector 3. The four attribute vectors are denoted as an attribute vector 1, an attribute vector 2, an attribute vector 3, and an attribute vector 4. The four resolution layers are denoted as a resolution layer 1, a resolution layer 2, a resolution layer 3, and a resolution layer 4 in sequence according to magnitudes of resolutions. The first virtual identity vector 1 corresponds to the resolution layer 1 and the resolution layer 2 with lower resolution, the first virtual identity vector 2 corresponds to the resolution layer 3 with medium resolution, and the first virtual identity vector 3 corresponds to the resolution layer 4 with the highest resolution. The four attribute vectors correspond to the four resolution layers in sequence according to magnitudes of resolutions.

For example, the first virtual identity vector 1 is inputted to the resolution layer 1 to obtain feature information 1; the attribute vector 1 and the feature information 1 are combined and then inputted to the resolution layer 2 along with the first virtual identity vector 2 to obtain feature information 2; the attribute vector 2 and the feature information 2 are combined and then inputted to the resolution layer 3 along with the first virtual identity vector 3 to obtain feature information 3; the attribute vector 3 and the feature information 3 are combined and then inputted to the resolution layer 4 along with the first virtual identity vector 4 to obtain feature information 4; and finally, the feature information 4 and the attribute vector 4 undergo processing such as combination to generate the de-identified image of the second training image.

Figure 7:
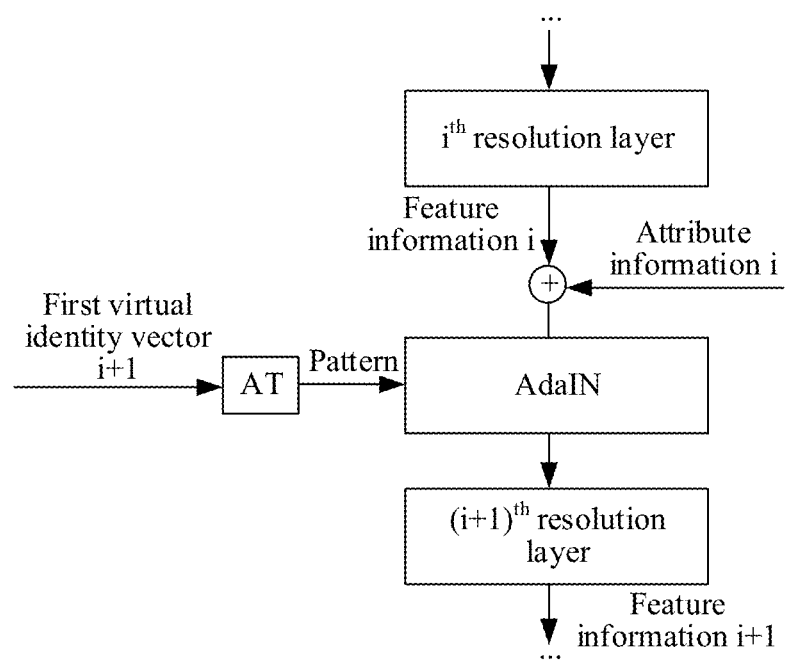
FIG. 7 is a schematic structural diagram of a generator according to an embodiment of the present disclosure.

In some embodiments, the generator is a style-based generator (StyleGAN2). As shown in FIG. 7, an AdaIN layer is included between two adjacent resolution layers of the generator. For example, affine transform (AT) is performed on a first virtual identity vector i+1; feature information i outputted by the $i^{th}$ resolution layer and an attribute vector i are combined and then inputted to the AdaIN layer along with first virtual identity vector i+1 obtained through affine transform; an AdaIN operation is performed, and an AdaIN operation result is inputted to the $(i+1)^{th}$ resolution layer.

The generator in this embodiment of the present disclosure may be alternatively an adversarial model, for example, a StyleGAN3 or a ProGAN. When different adversarial models are used as the generator, the de-identified image of the second training image may be determined in different manners. This is not limited in this embodiment of the present disclosure.

In some embodiments, the model training process in this embodiment of the present disclosure is described by using an example in which the first projector is a VAE, the second projector is a mapping network, the attribute extractor is an autoencoder, and the generator is a StyleGAN2.

Figure 8:
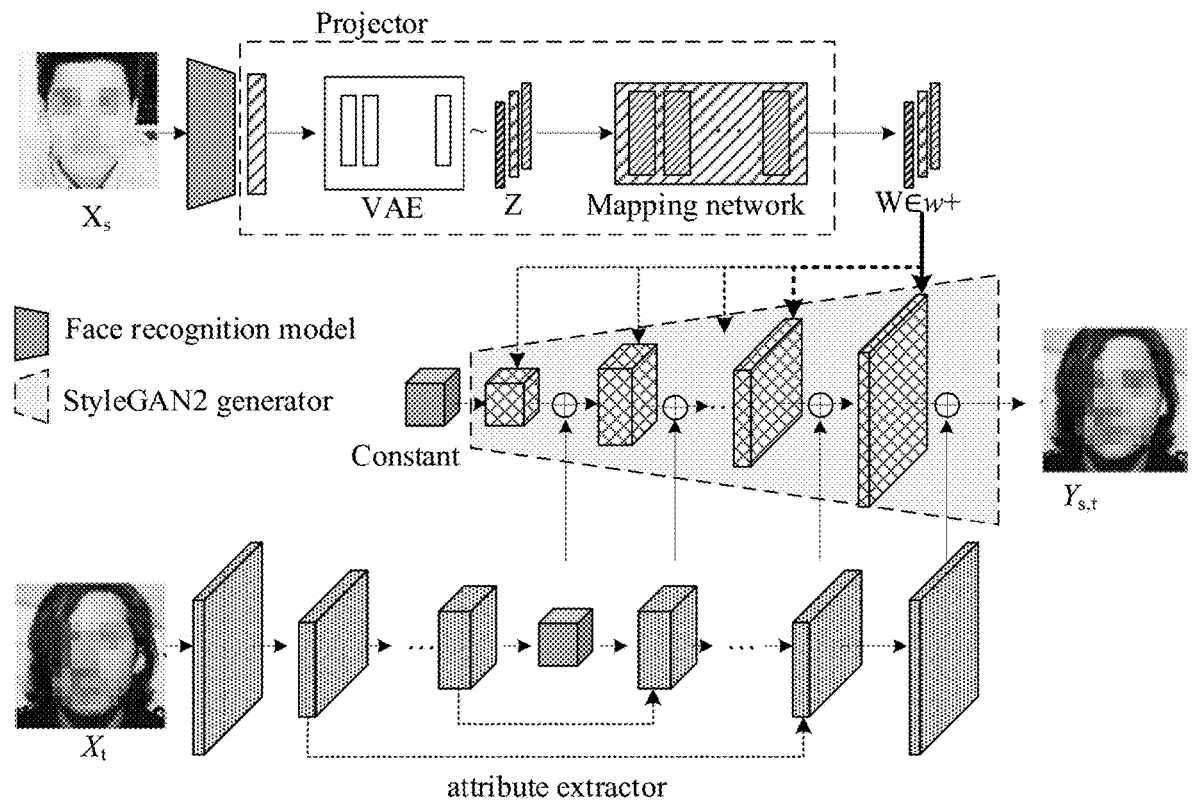
FIG. 8 is a schematic structural diagram of a target network model according to an embodiment of the present disclosure.

For example, as shown in FIG. 8, priori identity information is generated based on a first training image Xs by using a pre-trained face recognition model. Then the priori identity information is inputted to the VAE, and the VAE projects the priori identity information to the first space Z to obtain N latent identity vectors, for example, obtain N=3 latent identity vectors, the three latent identity vectors respectively corresponding to three different resolutions: low, medium, and high. Then the N latent identity vectors are inputted to the mapping network, and the mapping network projects the N latent identity vectors from the first space Z to the second space W to obtain N first virtual identity vectors. In addition, a second training image Xt is inputted to the autoencoder, and the autoencoder processes the second training image Xt to generate M attribute vectors. Finally, the M attribute vectors are inputted to layers of the StyleGAN2 as noises, and the N first virtual identity vectors are inputted to layers of the StyleGAN2 as patterns, to obtain an de-identified image Ys,t, outputted by the StyleGAN2, of the second training image.

According to the foregoing steps, the first training image and the second training image are inputted to the target network model to obtain the de-identified image, outputted by the target network model, of the second training image. Then the following S304 is performed to train the target network model.

S304: Determine a loss of the target network model according to the de-identified image, and train the target network model according to the loss.

According to the foregoing steps, the target network model outputs the de-identified image of the second training image, and the loss of the target network model is determined according to the de-identified image.

In some embodiments, the de-identified image is inputted to a judgment model, and the judgment model is a pre-trained model capable of predicting an anonymization degree of the de-identified image. For example, the de-identified image is inputted to the judgment model, and the judgment model performs identity recognition on the de-identified image, and determines a recognition result as the loss of the target network model. When recognition accuracy is high, an anonymization effect of the current target network model is not desired. In this case, a parameter in the target network model is adjusted according to the loss of the target network model. Then a new first training image and a new second training image are selected for performing the foregoing steps S301 to S304, to continue to train the target network model until the target network model meets a training end condition. The training end condition includes at least a quantity of training times reaching a preset quantity of times, or an anonymization degree of the model reaching an expected effect.

In some embodiments, when the first space Z shown in FIG. 5 is a latent space conforming to a standard Gaussian distribution, in this embodiment of the present disclosure, a KL divergence constraint $L_{kl}$ is applied to the N latent identity vectors in the first space Z to ensure that identity information is projected to a standard Gaussian distribution.

Based on this, in this embodiment of the present disclosure, the divergence constraint of the N latent identity vectors may be further determined. In this case, the determining a loss of the target network model according to the de-identified image may include: determining the loss of the target network model according to the de-identified image and the divergence constraint.

For example, the divergence constraint $L_{kl}$ of the N latent identity vectors may be determined by using the following formula (1):

$$L_{kl} = \tfrac{1}{2} \Sigma_{i \in N}(\mu_i^2 + \sigma_i^2 - \log \sigma_i^2 - 1) \qquad (1)$$

$\mu_i$ is a mean corresponding to the $i^{th}$ latent identity vector in the N latent identity vectors, and $\sigma_i$ is a variance corresponding to the $i^{th}$ latent identity vector in the N latent identity vectors.

The formula (1) is only an example, and a manner of determining the divergence constraint of the N latent identity vectors in this embodiment of the present disclosure includes but is not limited to the formula (1), and for example, may be another manner of calculating a divergence constraint, for example, by using a variant of the formula (1).

In this embodiment of the present disclosure, the divergence constraint $L_{kl}$ is applied to the N latent identity vectors. In this way, after training, the projector fully learns identity information, and the first space of the projector meets a standard Gaussian distribution. Therefore, during subsequent anonymization, the first space may be directly sampled to generate N latent identity vectors conforming to a standard Gaussian distribution, for generating a virtual identity vector.

In some embodiments, the second space is obtained by performing nonlinear mapping on the first space, and is a complex non-Gaussian distribution. As shown in FIG. 5, after identity information is mapped to the first space, it is found that a distribution of an intermediate latent space, namely, the second space W, is not uniform in this case, and real identity vectors gather to a plurality of different centers and do not overlap generated virtual identity vectors. Therefore, no reasonable face identity can be generated based on the virtual identity vectors. Therefore, this embodiment of the present disclosure proposes use of a contrastive loss to constrain a latent vector of the second space, namely, a W space (namely, the first virtual identity vector), so that latent vectors from the same identity gather and repel latent vectors from different identities, and all latent vectors are evenly distributed in the entire space.

Based on this, in this embodiment of the present disclosure, an identity loss may be further determined in the following manner:

Step 1: Obtain a third training image.

Step 2: Process the third training image by using a reference projector to obtain N second virtual identity vectors.

Step 3: Determine the identity loss according to the N first virtual identity vectors and the N second virtual identity vectors.

The third training image and first training image are two different images of a first target. For example, the third training image and the first training image are two different face images of the same user.

The reference projector and the projector have the same network structure, and are updated according to the projector. For example, the reference projector is updated according to momentum of the projector, that is, the reference projector is updated slowly with an update of the projector.

For example, the reference projector may be updated according to the following formula (2):

$$P\theta'(t)=(1-\Delta)*P\theta'(t-1)+\Delta*P\theta(t) \quad (2)$$

$P\theta'(t)$ is a reference projector parameter obtained after the $t^{th}$ update, $P\theta'(t-1)$ is a reference projector parameter obtained after the $(t-1)^{th}$ update, $P\theta(t)$ is a projector parameter obtained after the $t^{th}$ update, and $\Delta$ is a small value, for example, 0.01.

Figure 9:
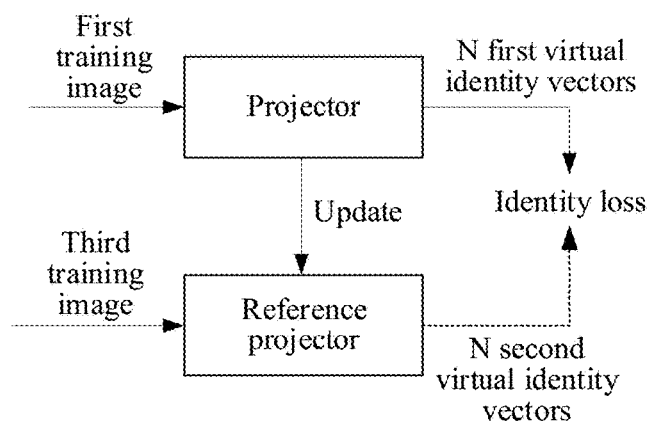
FIG. 9 and FIG. 10 are schematic diagrams of determining a contrastive loss according to an embodiment of the present disclosure.

As shown in FIG. 9, in the model training process, to determine the identity loss, in this embodiment of the present disclosure, the reference projector with network structure completely the same as that of the projector is set, to constrain the first virtual identity vector outputted by the projector. For example, the first training image is inputted to the projector to obtain the N first virtual identity vectors of the first training image, and the third training image is inputted to the reference projector to obtain the N second virtual identity vectors of the third training image. The first training image and the third training image are images of the same target, and the projector and the reference projector have the same network structure. In this way, after model training is completed, a difference between the N first virtual identity vectors corresponding to the first training image and the N second virtual identity vectors is small. Based on this, the projector in the target network model may be trained according to the N second virtual identity vectors and the N first virtual identity vectors corresponding to the first training image, so that the projector can generate a virtual identity vector that meets a requirement.

Manners of determining the identity loss according to the N first virtual identity vectors and the N second virtual identity vectors in step 3 include but are not limited to the following manners:

Manner 1: Determine differences between the N first virtual identity vectors and the N second virtual identity vectors at different resolutions, and determine a sum of the differences or an average value of the differences as the identity loss. For example, N is 3, a difference 1 between a first virtual identity vector 1 and a second virtual identity vector 1 is determined, a difference 2 between a first virtual identity vector 2 and a second virtual identity vector 2 is determined, and a difference 3 between a first virtual identity vector 3 and a second virtual identity vector 3 is determined. A sum of the difference 1, the difference 2, and the difference 3 is determined as the identity loss, or an average value of the difference 1, the difference 2, and the difference 3 is determined as the identity loss.

Manner 2: In this embodiment of the present disclosure, N dynamic lists K are designed, and the dynamic list stores representations of all different target identities (for example, face identities) in an entire training set in the second space: a W+space. In this case, the identity loss may be determined in the following manner according to the N first virtual identity vectors and the N second virtual identity vectors:

Step 31: For the $i^{th}$ first virtual identity vector in the N first virtual identity vectors, update, by using the $i^{th}$ second virtual identity vector, a virtual identity vector corresponding to the first target in the $i^{th}$ dynamic list.

The $i^{th}$ dynamic list includes virtual identity vectors of different targets at the $i^{th}$ resolution, and i is a positive integer ranging from 1 to N.

In this embodiment of the present disclosure, each of the N second virtual identity vectors corresponds to a dynamic list. For example, N is 3, and corresponds to a low resolution, a medium resolution, and a high resolution. In this case, there are also three dynamic lists: a first dynamic list corresponding to the low resolution, a second dynamic list corresponding to the medium resolution, and a third dynamic list corresponding to the high resolution.

Assuming that i is equal to 1, a virtual identity vector corresponding to the first target in the first dynamic list is updated by using the $1^{st}$ second virtual identity vector.

Assuming that i is equal to 2, a virtual identity vector corresponding to the first target in the second dynamic list is updated by using the $2^{nd}$ second virtual identity vector.

Assuming that i is equal to 3, a virtual identity vector corresponding to the first target in the third dynamic list is updated by using the 3rd second virtual identity vector.

Step 32: Determine, according to the $i^{th}$ first virtual identity vector and the updated $i^{th}$ dynamic list, an identity sub-loss corresponding to the $i^{th}$ first virtual identity vector.

Figure 10:
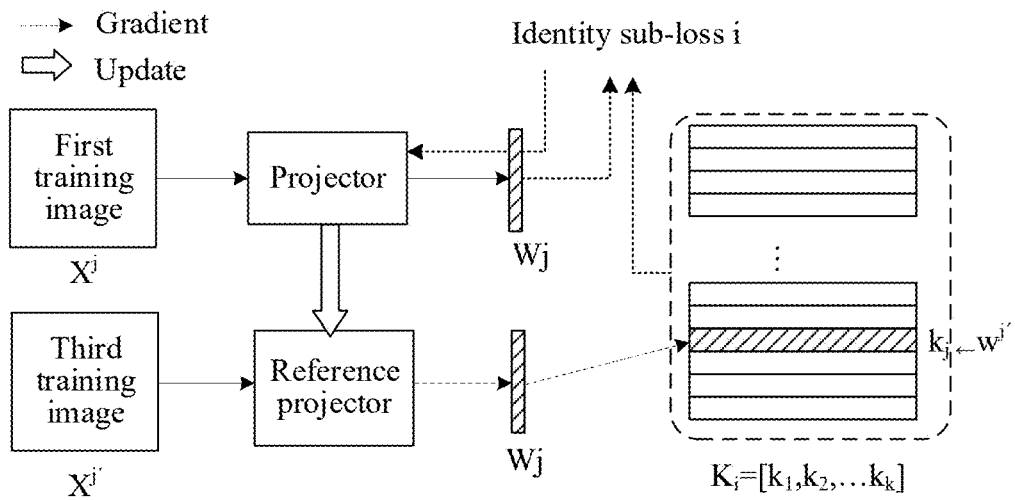

For example, as shown in FIG. 10, the first training image and the third training image are two different images of a first target j, the first training image Xj is inputted to the projector to obtain N first virtual identity vectors Wj, and the third training image Xj' is inputted to the reference projector to obtain N second virtual identity vectors Wj'. For the $i^{th}$ resolution in N resolutions, the $i^{th}$ dynamic list Ki includes second virtual identity vectors of different targets at the $i^{th}$ resolution, and the $i^{th}$ dynamic list Ki is updated in real time. For example, the $i^{th}$ second virtual identity vector is used for updating a virtual identity vector kj corresponding to the first target j in the $i^{th}$ dynamic list Ki, that is, kj is updated to Wj'. Then the identity sub-loss i corresponding to the $i^{th}$ first virtual identity vector is determined according to the $i^{th}$ second virtual identity vector and the updated $i^{th}$ dynamic list.

A manner of determining the identity sub-loss corresponding to the $i^{th}$ first virtual identity vector is not limited in this embodiment of the present disclosure.

For example, the identity sub-loss corresponding to the $i^{th}$ first virtual identity vector is determined according to the $i^{th}$ first virtual identity vector and the updated $i^{th}$ dynamic list by using a loss method, for example, a center loss or a triplet loss.

In some embodiments, the determining an identity sub-loss corresponding to the $i^{th}$ first virtual identity vector in the N first virtual identity vectors may include the following steps:

Step 321: Obtain a first ratio of the $i^{th}$ second virtual identity vector to a first preset value, multiply the first ratio by the $i^{th}$ first virtual identity vector to obtain a first result, and perform an exponential operation on the first result to obtain a first operation value.

Step 322: Obtain a second ratio of each second virtual identity vector to the first preset value in the updated $i^{th}$ dynamic list, for each second ratio, multiply the second ratio by the corresponding $i^{th}$ first virtual identity vector to obtain a second result, and perform an exponential operation on the second result to obtain a second operation value corresponding to each second virtual identity vector.

Step 323: Determine a sum of second operation values corresponding to all second virtual identity vectors, obtain a third ratio of the first operation value to the sum, and perform a logarithmic operation on the third ratio to obtain a third operation value.

Step 324: Determine a negative number of the third operation value as the identity sub-loss corresponding to the $i^{th}$ first virtual identity vector.

For example, $w^j$ is an anchor point, the $j^{th}$ item in Ki is a positive sample, and others are negative samples. An identity sub-loss $L_c$ is determined by using a contrastive loss in an information noise contrastive noise (InfoNCE) form. InfoNCE is a loss function for modifying autoregression based on mutual information.

For example, the identity sub-loss $L_c$ (i) corresponding to the $i^{th}$ first virtual identity vector is determined according to the following formula (3):

$$L_c(i) = -\log \frac{\exp\left(w^j \cdot \frac{K[j]}{\tau}\right)}{\sum_{k=1}^{K} \exp\left(w^k \cdot \frac{K[k]}{\tau}\right)} \quad (3)$$

$w^j$ is the $i^{th}$ first virtual identity vector of the first target j, K[j] is the $i^{th}$ second virtual identity vector of the first target j, $\tau$ is the first preset value, K[k] is the $i^{th}$ second virtual identity vector corresponding to the $k^{th}$ target in the $i^{th}$ dynamic list, $w^k$ is a first virtual identity vector corresponding to the $k^{th}$ target, and K is a total quantity of targets included in the $i^{th}$ dynamic list.

Step 33: Determine, as the identity loss of the target network model, a sum of identity sub-losses respectively corresponding to the N first virtual identity vectors.

After the identity sub-loss corresponding to the $i^{th}$ first virtual identity vector is determined according to step 32, the sum of the identity sub-losses respectively corresponding to the N first virtual identity vectors is determined as the identity loss. For example, N is 3. An identity sub-loss corresponding to each of the three first virtual identity vectors is determined according to the foregoing method, and then a sum of identity sub-losses corresponding to the three first virtual identity vectors is determined as the identity loss of the model.

In this embodiment of the present disclosure, after the identity loss in the model training process is determined according to the foregoing method, the determining the loss of the target network model according to the de-identified image and the divergence constraint includes the following steps:

determining the loss of the target network model according to the de-identified image, the divergence constraint, and the identity loss.

For example, a reconstruction loss between the de-identified image and the second training image is determined, and the loss of the target network model is determined according to the reconstruction loss, the divergence constraint, and the identity loss.

In an example, a difference between the de-identified image and the second training image is determined as the reconstruction loss. For example, a sum of differences between pixels of the de-identified image and corresponding pixels of the second training image is determined as the reconstruction loss.

In another example, the reconstruction loss $L_{rec}$ is determined according to the following formula (4):

$$L_{rec} = |Y_{s,t} - X_t|_1 \quad (4)$$

$Y_{s,t}$ is the de-identified image, $X_t$ is the second training image, and $|\cdot|_1$ is a 1-norm operation.

After the reconstruction loss $L_{rec}$ is determined according to the foregoing steps, the loss of the target network model is determined according to the reconstruction loss, the divergence constraint, and the identity loss. For example, a weighted sum of the reconstruction loss, the divergence constraint, and the identity loss is determined as a final loss of the target network model.

In some embodiments, to improve model training accuracy, this embodiment of the present disclosure further includes determining an identity contrastive loss of the de-identified image, for example, including the following steps:

Step A: Determine a first distance between the de-identified image and the first training image, a second distance between the de-identified image and the second training image, and a third distance between the first training image and the second training image.

Step B: Determine a contrastive loss according to the first distance, the second distance, and the third distance.

The first distance, the second distance, and the third distance may be determined by using any distance method, for example, a cosine distance.

Example 1: After the first distance, the second distance, and the third distance are determined according to step A, a sum of the first distance, the second distance, and the third distance is determined as the contrastive loss.

Example 2: A sum of the first distance and a square of a difference between the second distance and the third distance is determined, and a difference between a preset value and the sum is determined as the contrastive loss.

In an example, the contrastive loss $L_{ICL}$ is determined according to the following formula (5):

$$L_{ICL} = 1 - \cos(z_{id}(Y_{s,t}), z_{id}(X_s)) + (\cos(z_{id}(Y_{s,t}), z_{id}(X_t)) - \cos(z_{id}(X_s), z_{id}(X_t)))^2 \quad (5)$$

$z_{id}$ indicates a 512-dimensional identity vector representation, of an image X, that is extracted from a pre-trained face recognition model, $\cos(z_{id}(Y_{s,t}), z_{id}(X_s))$ is the first distance between the de-identified image and the first training image, $\cos(z_{id}(Y_{s,t}), z_{id}(X_t))$ is the second distance between the de-identified image and the second training image, and $\cos(z_{id}(X_s), z_{id}(X_t))$ is the third distance between the first training image and the second training image.

After the contrastive loss $L_{ICL}$ is determined according to the foregoing steps, the loss of the target network model is determined according to the reconstruction loss, the divergence constraint, the identity loss, and the contrastive loss. For example, a weighted sum of the reconstruction loss, the divergence constraint, the identity loss, and the contrastive loss is determined as the loss of the target network model.

In some embodiments, when the generator is an adversarial network, in the model training process, an adversarial loss of the model is further determined. For example, the adversarial loss is determined according to the de-identified image and the first training image.

For example, the adversarial loss $L_{GAN}$ is determined according to the following formula (6):

$$L_{GAN} = \min_G \max_D E[\log(D(X_s))] + E[\log(1 - D(Y_{s,t}))] \quad (6)$$

D is a discriminator, G is a generator, E(*) indicates an expected value of a distribution function, $D(X_s)$ is a discrimination result of the discriminator on the first training image $X_s$, and $D(Y_{s,t})$ is a discrimination result of the discriminator on the de-identified image $Y_{s,t}$.

After the adversarial loss $L_{GAN}$ is determined according to the foregoing steps, the loss of the target network model may be determined according to the reconstruction loss, the divergence constraint, the identity loss, the contrastive loss, and the adversarial loss. For example, a weighted sum of the reconstruction loss, the divergence constraint, the identity loss, the contrastive loss, and the adversarial loss is determined as the loss of the target network model.

Weight values corresponding to the reconstruction loss, the divergence constraint, the identity loss, the contrastive loss, and the adversarial loss are not limited in this embodiment of the present disclosure, and may be determined according to an actual requirement.

In some embodiments, a weighting operation is performed on the reconstruction loss, the divergence constraint, the identity loss, the contrastive loss, and the adversarial loss according to the following formula (7) to obtain the loss $L_{total}$ of the target network model:

$$L_{total}=L_{GAN}+10*L_{rec}+5*L_{ICL}+L_c+0.0001*L_{kl} \qquad (7)$$

A weight corresponding to each loss in the formula (7) is an example, and the weight corresponding to each loss in this embodiment of the present disclosure includes but is not limited to that shown in the formula (7), and may be determined as needed.

In some embodiments, to improve training accuracy of the target network model, a loss other than the losses described in the foregoing embodiment may be determined. This is not limited in this embodiment of the present disclosure, and may be determined according to an actual requirement.

It can be learned from the foregoing descriptions that, in this embodiment of the present disclosure, first virtual identity vectors corresponding to different resolutions are generated to implement de-identification. This can increase a resolution for anonymization. For example, an anonymization result at a resolution of $1024^2$ may be generated. In addition, little picture artifact is produced, and fidelity is high. In addition, in this embodiment of the present disclosure, model training does not rely on a key regression model or a segmentation model, that is, a face area in an image is not removed, and a posture, details, and occlusion in an original picture are retained.

In this embodiment of the present disclosure, in the application process of the target network model, the first training image is projected to the target space by using the projector to obtain the N first virtual identity vectors, so that the target network model can fully learn identity information in the image; attribute vector extraction is performed on the second training image to obtain the M attribute vectors, so that the target network model fully learns attribute information in the image; and image generation is performed based on the N first virtual identity vectors and the M attribute vectors to obtain the de-identified image of the second training image. In this way, a trained model can generate an image carrying virtual identity information while ensuring that attribute information of an original image remains unchanged; That is, the present disclosure provides a new target network model. With the foregoing training method, the target network model can learn identity information in the first training image, so that the target network model can independently generate a virtual identity, and the target network model also fully learns attribute information in the second training image. In an entire learning process, a face area in the image does not need to be removed, and no real identity information is required for guidance either. In addition, the target network model is trained by using a specific supervised target in a face swapping task, thereby improving fidelity and a resolution of an de-identified image generated by the target network model, so that the trained target network model can generate a high-quality de-identified image.

The foregoing describes in detail the model training method in the present disclosure with reference to FIG. 3 to FIG. 10. The following describes in detail an de-identification method in the present disclosure with reference to FIG. 11 to FIG. 13.

Figure 11:
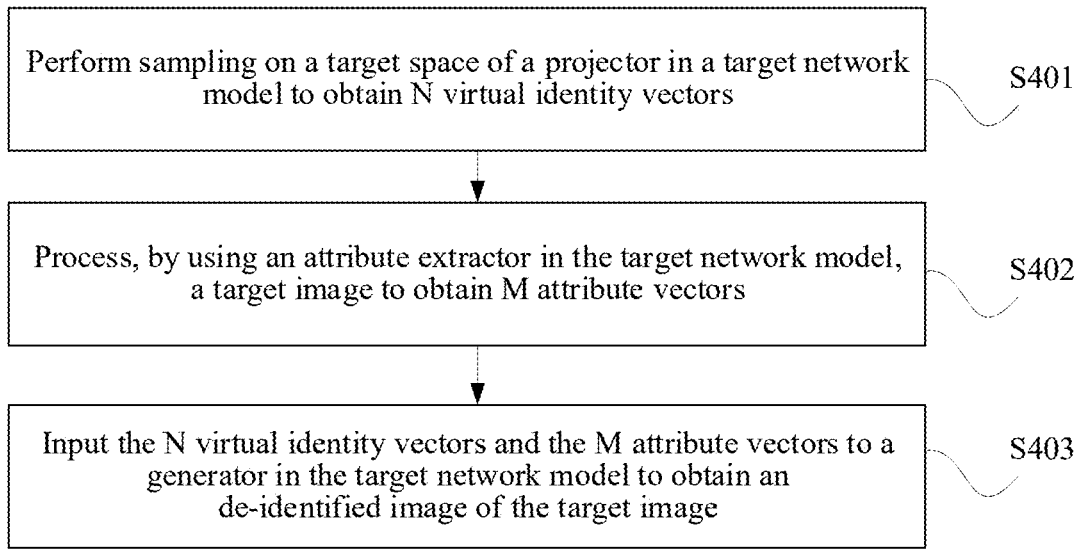
FIG. 11 is a schematic flowchart of an de-identification method according to an embodiment of the present disclosure.

FIG. 11 is a schematic flowchart of an de-identification method according to an embodiment of the present disclosure. The de-identification method shown in FIG. 11 is to perform de-identification by using the foregoing trained target network model. As shown in FIG. 11, the method includes:

S401: Perform sampling on a target space of a projector in the target network model to obtain N virtual identity vectors, N being a positive integer.

It can be learned from the foregoing embodiment that, in this embodiment of the present disclosure, the projector is trained by using a first training image, so that the projector fully learns identity information in the first training image. In this way, in actual use, sampling may be performed on the target space of the projector to obtain the N virtual identity vectors.

Implementations of S401 include but are not limited to the following:

Manner 1: Sampling is performed based on a mean and a variance of the target space of the trained projector to obtain the N virtual identity vectors. For example, random sampling is performed on a variance of the target space, and then the variance is added to the mean of the target space to obtain a virtual identity vector. The foregoing step may be repeatedly performed to obtain the N virtual identity vectors.

Manner 2: The target space includes a first space and a second space, the target network model includes a second projector. In this case, sampling may be performed on the target space of the projector in the target network model in the following manner to obtain the N virtual identity vectors:

performing sampling on the first space to obtain N latent identity vectors; and projecting, by using the second projector, the N latent identity vectors to the second space to obtain the N virtual identity vectors.

Figure 12:
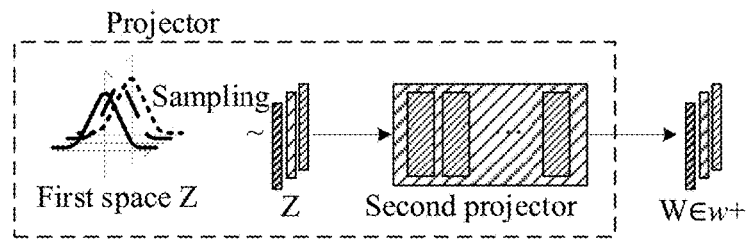
FIG. 12 is a schematic diagram of a projector according to an embodiment of the present disclosure.

In this embodiment of the present disclosure, during actual anonymization, the first projector in the projector is no longer used, and only the second projector in the projector is used for projection. For example, as shown in FIG. 12, sampling is performed on a first space Z conforming to a standard Gaussian distribution, to obtain N latent identity vectors, and then the N latent identity vectors are inputted to the second projector. The second projector projects the N latent identity vectors to the W space to obtain the N virtual identity vectors. In FIG. 12, for example, N is 3, and the second projector is a mapping network. However, the projector in this embodiment of the present disclosure is not limited to that shown in FIG. 12.

It can be learned from the foregoing descriptions that the first space is trained by using the first training image, so that a variance and a mean of the first space conform to a standard Gaussian distribution. In this case, sampling is first performed on the first space to generate the N latent identity vectors. For example, sampling is performed based on the mean and the variance of the first space to obtain the N latent identity vectors. Random sampling is performed on a variance of the first space, and then the variance is added to the mean of the first space to obtain a latent identity vector. The foregoing step may be repeatedly performed to obtain the N latent identity vectors. Then the N latent identity vectors are projected, by using the second projector, to the second space to obtain the N virtual identity vectors.

In some embodiments, the N virtual identity vectors respectively correspond to different resolutions. For example, N=3, the $1^{st}$ virtual identity vector corresponds to a low resolution, the $2^{nd}$ virtual identity vector corresponds to a medium resolution, and the $3^{rd}$ virtual identity vector corresponds to a high resolution.

After the N virtual identity vectors are obtained according to the foregoing method, the following steps of S402 and S403 are performed to obtain an de-identified image of a target image.

S402: Extract, by using an attribute extractor in the target network model, M attribute vectors from a target image, M being a positive integer.

In this embodiment of the present disclosure, the attribute extractor is configured to extract attribute information in the target image.

In some embodiments, the attribute extractor includes an encoding unit and a decoding unit. In this case, attribute vector extraction may be performed on the target image in the following manner to obtain the M attribute vectors:

inputting the target image to the encoding unit to obtain feature information of the target image; and inputting the feature information to the decoding unit to obtain the M attribute vectors.

In some embodiments, the encoding unit may include a plurality of feature extraction layers, and likewise, the decoding unit may also include a plurality of feature extraction layers. The feature extraction layer may include a convolutional layer or the like.

In some embodiments, a skip connection is implemented between at least one feature extraction layer in the encoding unit and at least one feature extraction layer in the decoding unit.

The generated M attribute vectors may correspond to different resolutions.

In some embodiments, the target network model is an autoencoder.

S403: Generate, by using a generator in the target network model, a de-identified image of the target image based on the N virtual identity vectors and the M attribute vectors.

According to the foregoing step, the generated N virtual identity vectors and M attribute vectors are inputted to the generator to obtain the de-identified image of the target image.

Implementations of S403 include but are not limited to the following examples:

Example 1: The N virtual identity vectors are spliced, the M attribute vectors are spliced, and a spliced virtual identity vector and a spliced attribute vector are combined and then inputted to the generator.

For example, the spliced virtual identity vector and the spliced attribute vector are concatenated and then inputted to the generator.

For another example, the spliced virtual identity vector and the spliced attribute vector are added up and then inputted to the generator.

Example 2: The generator includes a plurality of different resolution layers. In this case, according to resolutions corresponding to the N virtual identity vectors, the N virtual identity vectors may be inputted to a corresponding resolution layer as patterns, and the M attribute vectors may be inputted to a corresponding resolution layer as noises, to obtain the de-identified image of the target image.

In some embodiments, the generator is a StyleGAN2. In this case, as shown in FIG. 7, an AdaIN layer is included between two adjacent resolution layers of the generator. For example, affine transform is performed on a first virtual identity vector i+1; feature information outputted by the $i^{th}$ resolution layer and an attribute vector i are combined and then inputted to the AdaIN layer along with virtual identity vector i+1 obtained through affine transform; an AdaIN operation is performed, and an AdaIN operation result is inputted to the $(i+1)^{th}$ resolution layer.

The generator in this embodiment of the present disclosure may be alternatively an adversarial model, for example, a StyleGAN3 or a ProGAN. In some embodiments, the de-identification process in this embodiment of the present disclosure is described by using an example in which the second projector is a mapping network, the attribute extractor is an autoencoder, and the generator is a StyleGAN2.

Figure 13:
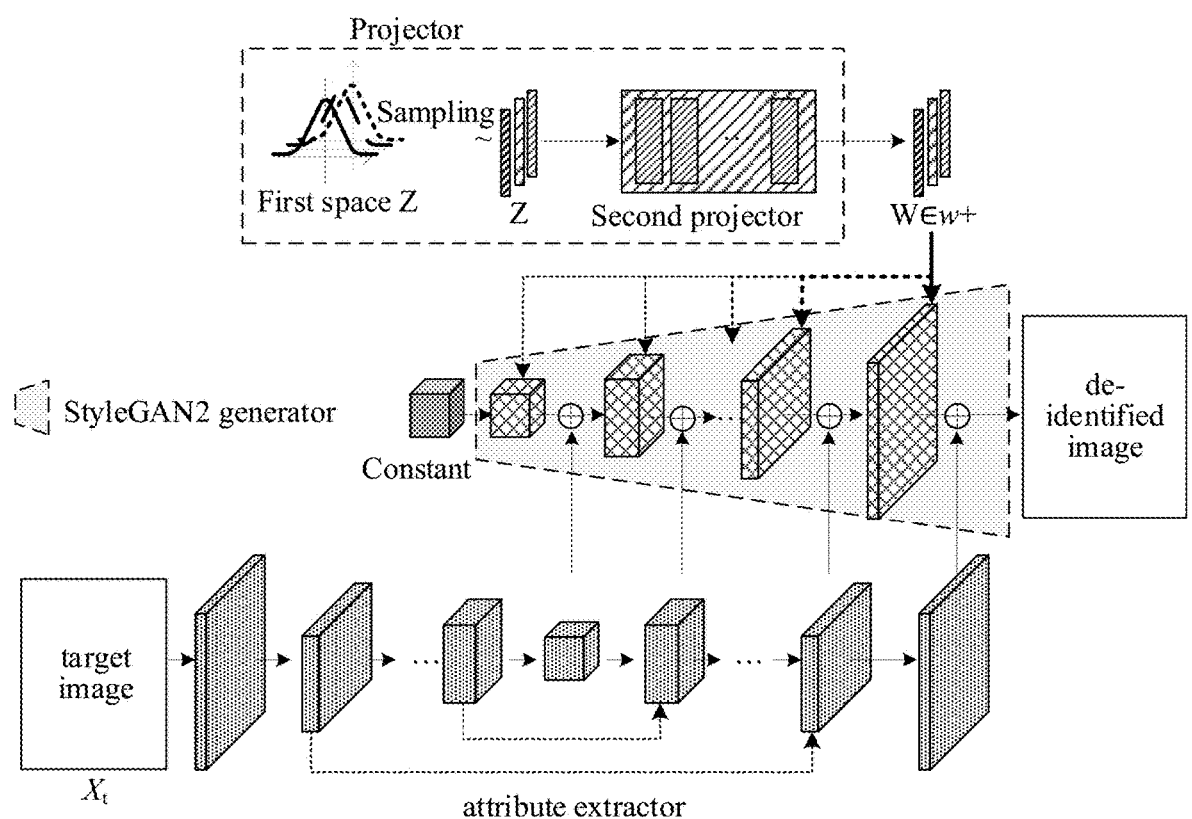
FIG. 13 is a schematic diagram of determining an de-identified image according to an embodiment of the present disclosure.

For example, as shown in FIG. 13, sampling is performed on the first space Z of the projector to obtain N latent identity vectors, for example, obtain N=3 latent identity vectors, the three latent identity vectors respectively corresponding to three different resolutions: low, module, and high. Then the N latent identity vectors are inputted to the mapping network, and the mapping network projects the N latent identity vectors from the first space Z to the second space W to obtain N virtual identity vectors. In addition, a target image Xt is inputted to the autoencoder, and the autoencoder processes the target image Xt to generate M attribute vectors. Finally, the M attribute vectors are inputted to layers of the StyleGAN2 as noises, and the N virtual identity vectors are inputted to layers of the StyleGAN2 as patterns, to obtain an de-identified image Ys,t, outputted by the StyleGAN2, of the target image.

In the de-identification method provided in this embodiment of the present disclosure, sampling is performed on the target space of the projector in the target network model to obtain the N virtual identity vectors; attribute vector extraction is performed, by using the attribute extractor in the target network model, on the target image to obtain the M attribute vectors; and image generation is performed by using the generator in the target network model based on the N virtual identity vectors and the M attribute vectors to obtain the de-identified image of the target image. That is, the target network model in this embodiment of the present disclosure may generate an independent virtual identity, and during de-identification on the target image, a face area in the target image does not need to be removed, thereby improving fidelity of de-identification.

Figure 14:
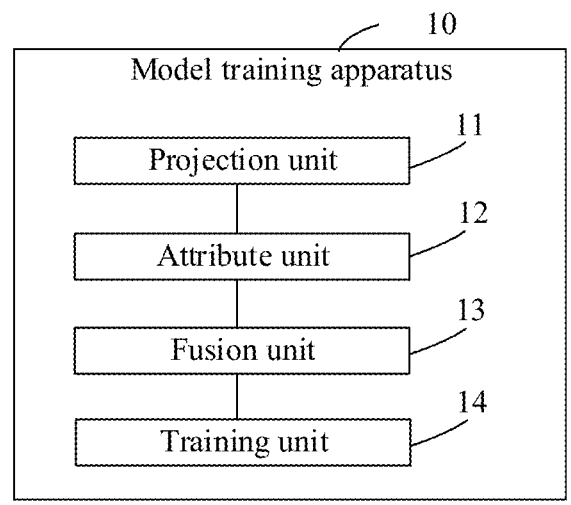
FIG. 14 is a schematic block diagram of a model training apparatus according to an embodiment of the present disclosure.

The foregoing describes in detail the method embodiments of the present disclosure with reference to FIG. 3 to FIG. 13. The following describes in detail apparatus embodiments of the present disclosure with reference to FIG. 14 and FIG. 15. FIG. 14 is a schematic block diagram of a model training apparatus according to an embodiment of the present disclosure. The training apparatus 10 may be a computing device, or a part of a computing device. As shown in FIG. 14, the model training apparatus 10 includes:

a projection unit 11, configured to project, by using a projector in a target network model, a first training image to a target space to obtain N first virtual identity vectors, N being a positive integer;

an attribute unit 12, configured to extract, by using an attribute extractor in the target network model, M attribute vectors from a second training image, M being a positive integer;

a fusion unit 13, configured to generate, by using a generator in the target network model, an de-identified image of the second training image based on the N first virtual identity vectors and the M attribute vectors; and a training unit 14, configured to determine a loss of the target network model according to the de-identified image, and train the target network model according to the loss.

In some embodiments, the projector includes a first projector and a second projector, the target space includes a first space and a second space, and the projection unit 11 is further configured to: extract priori identity information of the first training image; project, by using the first projector, the priori identity information to the first space to obtain N latent identity vectors; and project, by using the second projector, the N latent identity vectors to the second space to obtain the N first virtual identity vectors.

In some embodiments, the projection unit 11 is further configured to: project, by using the first projector, the priori identity information as a mean and a variance of the first space; and perform sampling based on the mean and the variance of the first space to obtain the N latent identity vectors.

In some embodiments, the training unit 14 is further configured to: determine a divergence constraint of the N latent identity vectors; and determine the loss of the target network model according to the de-identified image and the divergence constraint.

In some embodiments, the N first virtual identity vectors respectively correspond to different resolutions.

In some embodiments, the first projector is a variational autoencoder.

In some embodiments, the training unit 14 is further configured to: obtain a third training image, the third training image and the first training image being two different images of a first target; project, by using a reference projector in the target network model, the third training image to the target space to obtain N second virtual identity vectors, the reference projector and the projector having the same network structure, and being updated according to the projector; determine an identity loss according to the N first virtual identity vectors and the N second virtual identity vectors; and determine the loss of the target network model according to the de-identified image, the divergence constraint, and the identity loss.

In some embodiments, the training unit 14 is further configured to: for the $i^{th}$ second virtual identity vector in the N second virtual identity vectors, update, by using the $i^{th}$ second virtual identity vector, a virtual identity vector corresponding to the first target in the $i^{th}$ dynamic list, the $i^{th}$ dynamic list including virtual identity vectors of different targets at the $i^{th}$ resolution, and i being a positive integer ranging from 1 to N; determine, according to the $i^{th}$ first virtual identity vector and the updated $i^{th}$ dynamic list, an identity sub-loss corresponding to the $i^{th}$ first virtual identity vector; and determine, as the identity loss, a sum of identity sub-losses respectively corresponding to the N first virtual identity vectors.

In some embodiments, the training unit 14 is further configured to: obtain a first ratio of the $i^{th}$ second virtual identity vector to a first preset value, multiply the first ratio by the $i^{th}$ first virtual identity vector to obtain a first result, and perform an exponential operation on the first result to obtain a first operation value; obtain a second ratio of each second virtual identity vector to the first preset value in the updated $i^{th}$ dynamic list, for each second ratio, multiply the second ratio by the corresponding $i^{th}$ first virtual identity vector to obtain a second result, and perform an exponential operation on the second result to obtain a second operation value corresponding to each second virtual identity vector; determine a sum of second operation values corresponding to all second virtual identity vectors, obtain a third ratio of the first operation value to the sum, and perform a logarithmic operation on the third ratio to obtain a third operation value; and determine a negative number of the third operation value as the identity sub-loss corresponding to the $i^{th}$ first virtual identity vector.

In some embodiments, the attribute extractor includes an encoding unit and a decoding unit, and the attribute unit 12 is further configured to: perform, by using the encoding unit, feature extraction on the second training image to obtain feature information of the second training image; and decode, by using the decoding unit, the feature information to obtain M attribute vectors.

In some embodiments, a skip connection is implemented between at least one feature extraction layer in the encoding unit and at least one feature extraction layer in the decoding unit.

In some embodiments, the generator includes a plurality of different resolution layers, and the fusion unit 13 is further configured to: according to resolutions corresponding to the N first virtual identity vectors, input the N first virtual identity vectors to a corresponding resolution layer as patterns, and input the M attribute vectors to a corresponding resolution layer as noises, to obtain the de-identified image of the second training image.

In some embodiments, the training unit 14 is further configured to: determine a reconstruction loss between the de-identified image and the second training image; and determine the loss of the target network model based on the reconstruction loss, the divergence constraint, and the identity loss.

In some embodiments, the training unit 14 is further configured to: determine a first distance between the de-identified image and the first training image, a second distance between the de-identified image and the second training image, and a third distance between the first training image and the second training image; determine a contrastive loss according to the first distance, the second distance, and the third distance; and determine the loss of the target network model based on the reconstruction loss, the divergence constraint, the identity loss, and the contrastive loss.

In some embodiments, the training unit 14 is further configured to: determine a sum of the first distance and a square of a difference between the second distance and the third distance; and determine a difference between a preset value and the sum as the contrastive loss.

In some embodiments, when the generator is an adversarial network, the training unit 14 is further configured to: determine an adversarial loss according to the de-identified image and the first training image; and determine a weighted sum of the reconstruction loss, the divergence constraint, the identity loss, the contrastive loss, and the adversarial loss as the loss of the target network model.

It should be understood that the device embodiments and the method embodiments correspond to each other. For a similar description, refer to the method embodiments. To avoid repetition, details are not described herein again. For example, the apparatus shown in FIG. 14 may perform the embodiment of the model training method shown in FIG. 3, and the foregoing and other operations and/or functions of the modules in the apparatus are separately intended to implement the method embodiments corresponding to the computing device. For brevity, details are not described herein again.

Figure 15:
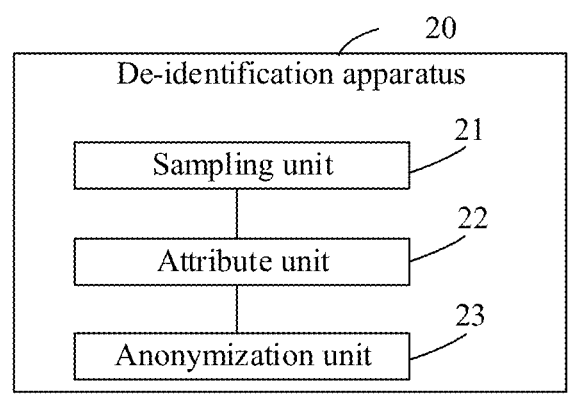
FIG. 15 is a schematic block diagram of an de-identification apparatus according to an embodiment of the present disclosure.

FIG. 15 is a schematic block diagram of an de-identification apparatus according to an embodiment of the present disclosure. The de-identification apparatus 20 may be a computing device, or a part of a computing device. As shown in FIG. 15, the de-identification apparatus 20 includes:

a sampling unit 21, configured to perform sampling on a target space of a projector in a target network model to obtain N virtual identity vectors, N being a positive integer;

an attribute unit 22, configured to perform, by using an attribute extractor in the target network model, M attribute vectors from a target image, M being a positive integer; and an anonymization unit 23, configured to generate, by using a generator in the target network model, a de-identified image of the target image based on the N virtual identity vectors and the M attribute vectors.

In some embodiments, the target space includes a first space and a second space, the target network model includes a second projector, and the sampling unit 21 is further configured to: perform sampling on the first space to obtain N latent identity vectors; and project, by using the second projector, the N latent identity vectors to the second space to obtain the N virtual identity vectors.

In some embodiments, a mean and a variance of the first space meet a standard Gaussian distribution, and the sampling unit 21 is further configured to perform sampling based on the mean and the variance of the first space to obtain the N latent identity vectors.

In some embodiments, the N virtual identity vectors respectively correspond to different resolutions.

In some embodiments, the attribute extractor includes an encoding unit and a decoding unit, and the attribute unit 22 is further configured to: perform, by using the encoding unit, feature extraction on the target image to obtain feature information of the target image; and decode, by using the decoding unit, the feature information to obtain M attribute vectors.

In some embodiments, a skip connection is implemented between at least one feature extraction layer in the encoding unit and at least one feature extraction layer in the decoding unit.

In some embodiments, the generator includes a plurality of different resolution layers, and the anonymization unit 23 is further configured to: according to resolutions corresponding to the N virtual identity vectors, input the N virtual identity vectors to a corresponding resolution layer as patterns, and input the M attribute vectors to a corresponding resolution layer as noises, to obtain the de-identified image of the target image.

It should be understood that the device embodiments and the method embodiments correspond to each other. For a similar description, refer to the method embodiments. To avoid repetition, details are not described herein again. For example, the apparatus shown in FIG. 15 may perform the embodiment of the de-identification method shown in FIG. 11, and the foregoing and other operations and/or functions of the modules in the apparatus are separately intended to implement the method embodiments corresponding to the computing device. For brevity, details are not described herein again.

The foregoing describes the apparatuses in the embodiments of the present disclosure from a perspective of functional modules with reference to the accompanying drawings. The functional modules and/or units may be implemented in a form of hardware, or may be implemented by instructions in a form of software, or may be implemented by a combination of hardware and software modules. For example, the steps of the method embodiments in the embodiments of the present disclosure may be performed by an integrated logic circuit in a processor and/or instructions in a form of software, and the steps of the methods disclosed with reference to the embodiments of the present disclosure may be directly performed by a hardware decoding processor, or may be performed by a combination of hardware and software modules in a decoding processor. In some embodiments, the software module may be located in a mature storage medium in the art, such as a random access memory, a flash memory, a read-only memory, a programmable read-only memory, an electrically-erasable programmable memory, and a register. The storage medium is located in the memory. The processor reads information in the memory and completes the steps of the foregoing method embodiments in combination with hardware thereof.

Figure 16:
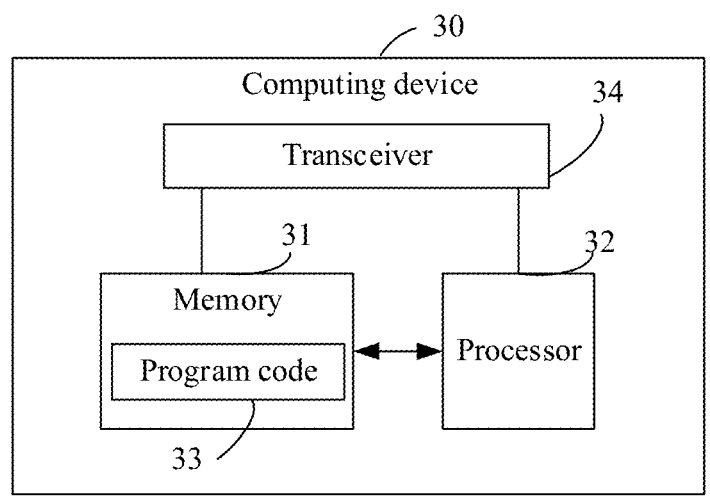
FIG. 16 is a schematic block diagram of a computing device according to an embodiment of the present disclosure.

FIG. 16 is a schematic block diagram of a computing device according to an embodiment of the present disclosure. The computing device is configured to perform the foregoing method embodiments. As shown in FIG. 16, the computing device 30 may include:

a memory 31 and a processor 32, the memory 31 being configured to store a computer program 33 and transmit the program code 33 to the processor 32. In other words, the processor 32 may invoke the computer program 33 from the memory 31 and run the computer program 33, to implement the methods in the embodiments of the present disclosure.

For example, the processor 32 may be configured to perform the foregoing method steps according to instructions in the computer program 33.

In some embodiments of the present disclosure, the processor 32 may include but is not limited to:

a general processor, a digital signal processor (Digital Signal Processing, DSP), an application-specific integrated circuit (Application Specific Integrated Circuit, ASIC), a field programmable gate array (Field Programmable Gate Array, FPGA), another programmable logic device, a discrete gate, a transistor logic device, or a discrete hardware component.

In some embodiments, the storage module 31 includes, but is not limited to:

a non-volatile and/or volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

In some embodiments of the present disclosure, the computer program 33 may be divided into one or more modules, and the one or more modules are stored in the memory 31 and executed by the processor 32 to perform the mode training method and/or de-identification method provided in the present disclosure. The one or more modules may be a series of computer program instruction segments capable of performing specific functions, and the instruction segments are used for describing execution processes of the computer program 33 on the computing device.

As shown in FIG. 16, the computing device 30 may further include:

a transceiver 34, where the transceiver 34 may be connected to the processor 32 or the memory 31.

The processor 32 may control the transceiver 34 to communicate with another device. For example, information or data may be sent to another device or receive information or data sent by another device. The transceiver 34 may include a transmitter and a receiver. The transceiver 34 may further include an antenna, and a quantity of the antenna can be one or more.

Various components of the computer device 30 are connected to each other by using a bus system. In addition to including a data bus, the bus system further includes a power bus, a control bus, and a status signal bus.

An embodiment of the present disclosure provides a computer storage medium, where the computer storage medium stores a computer program, and when the computer program is executed by a computer, the method in any one of the foregoing embodiments is implemented by the computer. or, a computer program product including instructions is further provided in the embodiments of the present disclosure. When the instructions run on a computer, the computer is caused to perform the method provided in the foregoing method embodiments.

According to an aspect of the embodiments of the present disclosure, a computer program product or a computer program is provided, the computer program product or the computer program including computer instructions, the computer instructions being stored in a computer-readable storage medium. A processor of a computer device reads the computer instructions from the computer-readable storage medium. The processor executes the computer instructions, so that the computer device performs the method in the foregoing various method embodiments.

The foregoing descriptions are merely a specific implementation of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A model training method, the method being performed by a computing device, and comprising:

projecting, by using a projector in a target network model, a first training image to a target space to obtain N first virtual identity vectors, N being a positive integer;

extracting, by using an attribute extractor in the target network model, M attribute vectors from a second training image, M being a positive integer;

obtaining a third training image, the third training image and the first training image being two different images of a first target;

projecting, by using a reference projector in the target network model, the third training image to the target space to obtain N second virtual identity vectors, the reference projector and the projector having the same network structure, and being updated according to the projector;

generating, by using a generator in the target network model, a de-identified image of the second training image based on the N first virtual identity vectors and the M attribute vectors;

determining an identity loss according to the N first virtual identity vectors and the N second virtual identity vectors, comprising:

for an $i^{th}$ second virtual identity vector in the N second virtual identity vectors, updating, by using the $i^{th}$ second virtual identity vector, a virtual identity vector corresponding to the first target in an $i^{th}$ dynamic list, the $i^{th}$ dynamic list comprising virtual identity vectors of different targets at the $i^{th}$ resolution, and i being a positive integer ranging from 1 to N;

determining, according to an $i^{th}$ first virtual identity vector and the updated $i^{th}$ dynamic list, an identity sub-loss corresponding to the $i^{th}$ first virtual identity vector; and determining, as the identity loss, a sum of identity sub-losses respectively corresponding to the N first virtual identity vectors; and determining a loss of the target network model according to the de-identified image and the identity loss, and training the target network model according to the loss.

2. The method according to claim 1, wherein the projector comprises a first projector and a second projector, the target space comprises a first space and a second space, and the projecting, by using a projector in a target network model, a first training image to a target space to obtain N first virtual identity vectors comprises:

extracting priori identity information of the first training image;

projecting, by using the first projector, the priori identity information to the first space to obtain N latent identity vectors; and projecting, by using the second projector, the N latent identity vectors to the second space to obtain the N first virtual identity vectors.

3. The method according to claim 2, wherein the projecting, by using the first projector, the priori identity information to the first space to obtain N latent identity vectors comprises:

projecting, by using the first projector, the priori identity information as a mean and a variance of the first space; and performing sampling based on the mean and the variance of the first space to obtain the N latent identity vectors.

4. The method according to claim 1, wherein the method further comprises:

determining a divergence constraint of the N latent identity vectors; and determining the loss of the target network model according to the de-identified image, the identity loss, and the divergence constraint.

5. The method according to claim 4, wherein the determining the loss of the target network model according to the de-identified image, the divergence constraint, and the identity loss comprises:

determining a reconstruction loss between the de-identified image and the second training image; and determining the loss of the target network model based on the reconstruction loss, the divergence constraint, and the identity loss.

6. The method according to claim 5, wherein the method further comprises:

determining a first distance between the de-identified image and the first training image, a second distance between the de-identified image and the second training image, and a third distance between the first training image and the second training image; and determining a contrastive loss according to the first distance, the second distance, and the third distance; and the determining the loss of the target network model based on the reconstruction loss, the divergence constraint, and the identity loss comprises:

determining the loss of the target network model based on the reconstruction loss, the divergence constraint, the identity loss, and the contrastive loss.

7. The method according to claim 6, wherein the determining a contrastive loss according to the first distance, the second distance, and the third distance comprises:

determining a sum of the first distance and a square of a difference between the second distance and the third distance; and determining a difference between a preset value and the sum as the contrastive loss.

8. The method according to claim 6, wherein when the generator is an adversarial network, the determining the loss of the target network model based on the reconstruction loss, the divergence constraint, the identity loss, and the contrastive loss comprises:

determining an adversarial loss according to the de-identified image and the first training image; and determining a weighted sum of the reconstruction loss, the divergence constraint, the identity loss, the contrastive loss, and the adversarial loss as the loss of the target network model.

9. The method according to claim 1, wherein the determining, according to an $i^{th}$ first virtual identity vector and the updated $i^{th}$ dynamic list, an identity sub-loss corresponding to the $i^{th}$ first virtual identity vector comprises:

obtaining a first ratio of the $i^{th}$ second virtual identity vector to a first preset value, multiplying the first ratio by the $i^{th}$ first virtual identity vector to obtain a first result, and performing an exponential operation on the first result to obtain a first operation value;

obtaining a second ratio of each second virtual identity vector to the first preset value in the updated $i^{th}$ dynamic list, for each second ratio, multiplying the second ratio by the corresponding $i^{th}$ first virtual identity vector to obtain a second result, and performing an exponential operation on the second result to obtain a second operation value corresponding to each second virtual identity vector;

determining a sum of second operation values corresponding to all second virtual identity vectors, obtaining a third ratio of the first operation value to the sum, and performing a logarithmic operation on the third ratio to obtain a third operation value; and determining a negative number of the third operation value as the identity sub-loss corresponding to the $i^{th}$ first virtual identity vector.

10. The method according to claim 1, wherein the attribute extractor comprises an encoder and a decoder, and the extracting, by using an attribute extractor in the target network model, M attribute vectors from a second training image comprises:

performing, by using the encoder, feature extraction on the second training image to obtain feature information of the second training image; and decoding, by using the decoder, the feature information to obtain M attribute vectors.

11. The method according to claim 1, wherein the generator comprises a plurality of different resolution layers, and the generating, by using a generator in the target network model, an de-identified image of the second training image based on the N first virtual identity vectors and the M attribute vectors comprises:

according to resolutions corresponding to the N first virtual identity vectors, inputting the N first virtual identity vectors to a corresponding resolution layer as patterns, and inputting the M attribute vectors to a corresponding resolution layer as noises, to obtain the de-identified image of the second training image.

12. A non-transitory computer-readable storage medium, storing a computer program, the computer program, when executed, causing the computer device to implement:

projecting, by using a projector in a target network model, a first training image to a target space to obtain N first virtual identity vectors, N being a positive integer;

extracting, by using an attribute extractor in the target network model, M attribute vectors from a second training image, M being a positive integer;

obtaining a third training image, the third training image and the first training image being two different images of a first target;

projecting, by using a reference projector in the target network model, the third training image to the target space to obtain N second virtual identity vectors, the reference projector and the projector having the same network structure, and being updated according to the projector;

generating, by using a generator in the target network model, a de-identified image of the second training image based on the N first virtual identity vectors and the M attribute vectors;

determining an identity loss according to the N first virtual identity vectors and the N second virtual identity vectors, comprising:

for an $i^{th}$ second virtual identity vector in the N second virtual identity vectors, updating, by using the $i^{th}$ second virtual identity vector, a virtual identity vector corresponding to the first target in an $i^{th}$ dynamic list, the $i^{th}$ dynamic list comprising virtual identity vectors of different targets at the $i^{th}$ resolution, and i being a positive integer ranging from 1 to N;

determining, according to an $i^{th}$ first virtual identity vector and the updated $i^{th}$ dynamic list, an identity sub-loss corresponding to the $i^{th}$ first virtual identity vector; and determining, as the identity loss, a sum of identity sub-losses respectively corresponding to the N first virtual identity vectors; and determining a loss of the target network model according to the de-identified image and the identity loss, and training the target network model according to the loss.

13. The storage medium according to claim 12, wherein the projector comprises a first projector and a second projector, the target space comprises a first space and a second space, and the projecting, by using a projector in a target network model, a first training image to a target space to obtain N first virtual identity vectors comprises:
    extracting priori identity information of the first training image;
    projecting, by using the first projector, the priori identity information to the first space to obtain N latent identity vectors; and
    projecting, by using the second projector, the N latent identity vectors to the second space to obtain the N first virtual identity vectors.

14. The storage medium according to claim 13, wherein the projecting, by using the first projector, the priori identity information to the first space to obtain N latent identity vectors comprises:
    projecting, by using the first projector, the priori identity information as a mean and a variance of the first space; and
    performing sampling based on the mean and the variance of the first space to obtain the N latent identity vectors.

15. The storage medium according to claim 12, wherein the program further causes the computer device to implement:
    determining a divergence constraint of the N latent identity vectors; and
    determining the loss of the target network model according to the de-identified image, the identity loss, and the divergence constraint.

16. The storage medium according to claim 15, wherein the determining the loss of the target network model according to the de-identified image, the divergence constraint, and the identity loss comprises:
    determining a reconstruction loss between the de-identified image and the second training image; and
    determining the loss of the target network model based on the reconstruction loss, the divergence constraint, and the identity loss.

17. The storage medium according to claim 12, wherein the determining, according to an $i^{th}$ first virtual identity vector and the updated $i^{th}$ dynamic list, an identity sub-loss corresponding to the $i^{th}$ first virtual identity vector comprises:
    obtaining a first ratio of the $i^{th}$ second virtual identity vector to a first preset value, multiplying the first ratio by the $i^{th}$ first virtual identity vector to obtain a first result, and performing an exponential operation on the first result to obtain a first operation value;
    obtaining a second ratio of each second virtual identity vector to the first preset value in the updated $i^{th}$ dynamic list, for each second ratio, multiplying the second ratio by the corresponding $i^{th}$ first virtual identity vector to obtain a second result, and performing an exponential operation on the second result to obtain a second operation value corresponding to each second virtual identity vector;
    determining a sum of second operation values corresponding to all second virtual identity vectors, obtaining a third ratio of the first operation value to the sum, and performing a logarithmic operation on the third ratio to obtain a third operation value; and
    determining a negative number of the third operation value as the identity sub-loss corresponding to the $i^{th}$ first virtual identity vector.

18. The storage medium according to claim 12, wherein the attribute extractor comprises an encoder and a decoder, and the extracting, by using an attribute extractor in the target network model, M attribute vectors from a second training image comprises:
    performing, by using the encoder, feature extraction on the second training image to obtain feature information of the second training image; and
    decoding, by using the decoder, the feature information to obtain M attribute vectors.

19. The storage medium according to claim 12, wherein the generator comprises a plurality of different resolution layers, and the generating, by using a generator in the target network model, an de-identified image of the second training image based on the N first virtual identity vectors and the M attribute vectors comprises:
    according to resolutions corresponding to the N first virtual identity vectors, inputting the N first virtual identity vectors to a corresponding resolution layer as patterns, and inputting the M attribute vectors to a corresponding resolution layer as noises, to obtain the de-identified image of the second training image.

20. A computer device, comprising:
    a processor and a memory, the memory being configured to store a computer program, the processor being configured to invoke and run the computer program stored in the memory to perform:
    projecting, by using a projector in a target network model, a first training image to a target space to obtain N first virtual identity vectors, N being a positive integer;
    extracting, by using an attribute extractor in the target network model, M attribute vectors from a second training image, M being a positive integer;
    obtaining a third training image, the third training image and the first training image being two different images of a first target;
    projecting, by using a reference projector in the target network model, the third training image to the target space to obtain N second virtual identity vectors, the reference projector and the projector having the same network structure, and being updated according to the projector;
    generating, by using a generator in the target network model, a de-identified image of the second training image based on the N first virtual identity vectors and the M attribute vectors;
    determining an identity loss according to the N first virtual identity vectors and the N second virtual identity vectors, comprising:
        for an $i^{th}$ second virtual identity vector in the N second virtual identity vectors, updating, by using the $i^{th}$ second virtual identity vector, a virtual identity vector corresponding to the first target in an $i^{th}$ dynamic list, the $i^{th}$ dynamic list comprising virtual identity vectors of different targets at the $i^{th}$ resolution, and i being a positive integer ranging from 1 to N;
        determining, according to an $i^{th}$ first virtual identity vector and the updated $i^{th}$ dynamic list, an identity sub-loss corresponding to the $i^{th}$ first virtual identity vector; and
        determining, as the identity loss, a sum of identity sub-losses respectively corresponding to the N first virtual identity vectors; and
    determining a loss of the target network model according to the de-identified image and the identity loss, and training the target network model according to the loss.

* * * * *